United States Patent
Tobari et al.

(10) Patent No.: US 6,670,786 B2
(45) Date of Patent: *Dec. 30, 2003

(54) APPARATUS FOR CONTROLLING AN INDUCTION MOTOR

(75) Inventors: Kazuaki Tobari, Hitachiota (JP); Toshiaki Okuyama, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 10/004,814

(22) Filed: Dec. 7, 2001

(65) Prior Publication Data

US 2002/0060549 A1 May 23, 2002

Related U.S. Application Data

(62) Division of application No. 09/550,252, filed on Apr. 14, 2000, now Pat. No. 6,344,726.

(30) Foreign Application Priority Data

Apr. 23, 1999 (JP) ............................................ 11-115941

(51) Int. Cl.⁷ ................................................ H02P 5/28
(52) U.S. Cl. ...................... 318/805; 318/807; 318/808; 318/825; 318/798; 318/782; 318/432
(58) Field of Search ................................ 318/805, 807, 318/808, 825, 798, 782, 432

(56) References Cited

U.S. PATENT DOCUMENTS

| | | | |
|---|---|---|---|
| 4,484,128 A | 11/1984 | Jotten et al. | |
| 4,885,520 A | 12/1989 | Sugimoto et al. | |
| 5,959,430 A | 9/1999 | Yuki et al. | ............... 318/805 |
| 5,994,867 A | 11/1999 | Birk et al. | |
| 6,014,007 A | 1/2000 | Seibel et al. | ............... 318/805 |
| 6,194,864 B1 * | 2/2001 | Kinpara et al. | ............... 318/805 |

FOREIGN PATENT DOCUMENTS

| | | |
|---|---|---|
| EP | 884835 | 12/1998 |
| EP | 944164 A1 | 9/1999 |
| JP | 7303399 | 11/1995 |
| JP | 8080098 | 3/1996 |
| JP | 8084500 | 3/1996 |
| JP | 8205600 | 8/1996 |
| WO | 98 23335 | 6/1998 |

OTHER PUBLICATIONS

"Simplified Vector Control System without Speed and Voltage Sensors—Effects of Setting Errors in Control Parameters and their Compensation—" by T. Okuyama et al., T. IEEE Japan, vol. 110–D, No. 5, 1990.

* cited by examiner

Primary Examiner—Karen Masih
(74) Attorney, Agent, or Firm—Antonelli, Terry, Stout & Kraus, LLP

(57) ABSTRACT

If a speed instruction value is less than a predetermined value, the output current of a power-conversion unit is controlled to be larger than a current value in an ordinary no-load operation, or a frequency instruction value is calculated based on a speed instruction value in place of an estimated speed.

32 Claims, 15 Drawing Sheets

APPARATUS FOR CONTROLLING AN INDUCTION MOTOR

CROSS-REFERENCE TO RELATED APPLICATIONS

This application is a divisional of U.S. application Ser. No. 09/550,252, filed in the U.S. Patent and Trademark Office on Apr. 14, 2000, now U.S. Pat. No. 6,344,726, and priority is hereby claimed under 35 USC 119 and 120 based on the aforementioned U.S. patent application and Japanese Patent Application Serial No. 11-115941, filed Apr. 23, 1999.

BACKGROUND OF THE INVENTION

The present invention relates in general to an apparatus for controlling the rotational speed (hereafter referred to as the speed) of an induction motor; and, the invention relates especially to a an apparatus using a vector control method which operates without a speed sensor, and is capable of achieving a highly accurate speed control without a speed sensor, and which can obtain high torque from a zero speed range.

In the vector control of an induction motor, the output frequency of a power-conversion unit for the induction motor usually corresponds to the sum of the speed and the calculated slip frequency. On the other hand, in the vector control method which operates without a speed sensor, the output frequency of the power-conversion unit is controlled with an estimated value of the speed in place of a detected value of the speed. However, since the estimated value of the speed includes an error, the actual slip frequency shifts from the target reference value. In this situation, the magnetic flux (hereafter referred to as the flux) in the induction motor varies according to the torque, and accordingly the torque generated by the induction motor is not proportional to the torque current, which in turn causes a shortage of torque in an extreme case.

Setting-errors in characteristic parameters of the induction motor, which are used for estimating the speed, and changes in the flux in the induction motor, which are caused by the errors, etc., are considered to be the causes of the errors in the estimated speed. A means to effectively correct those changes of the flux has not been devised, and a shortage of torque sometimes occurs in the range near zero speed. A report "Simplified Vector Control System without Speed and Voltage Sensors—Effects of Setting Errors in Control Parameters and their Compensation" by T. Okuyama et al., T. IEE Japan, Vol. 110-D, No. 5, '90, discloses the effects of the setting errors in the parameters and a means to compensate the effects due to the setting errors of the parameters of the induction motor.

SUMMARY OF THE INVENTION

An object of the present invention is to provide a an apparauts using method of accurately and efficiently controlling an induction motor without experiencing the effects of errors in an estimated speed due to changes in constants of the induction motor.

To achieve the above object, the present invention provides a speed-control apparatus for an induction motor for controlling the current output from a power-conversion unit so that it is larger than a current value in the ordinary no-load operation, or for controlling the frequency output from the power-conversion unit by calculating a frequency instruction value based on a speed instruction value in place of an estimated speed value if the speed instruction value is less than a predetermined value. By the above control, it is possible to prevent a shortage of torque in the low speed range near zero speed.

DETAILED DESCRIPTION OF THE EMBODIMENTS

Hereafter, details of the embodiments according to the present invention will be explained with reference to the drawings.

Figure 1:
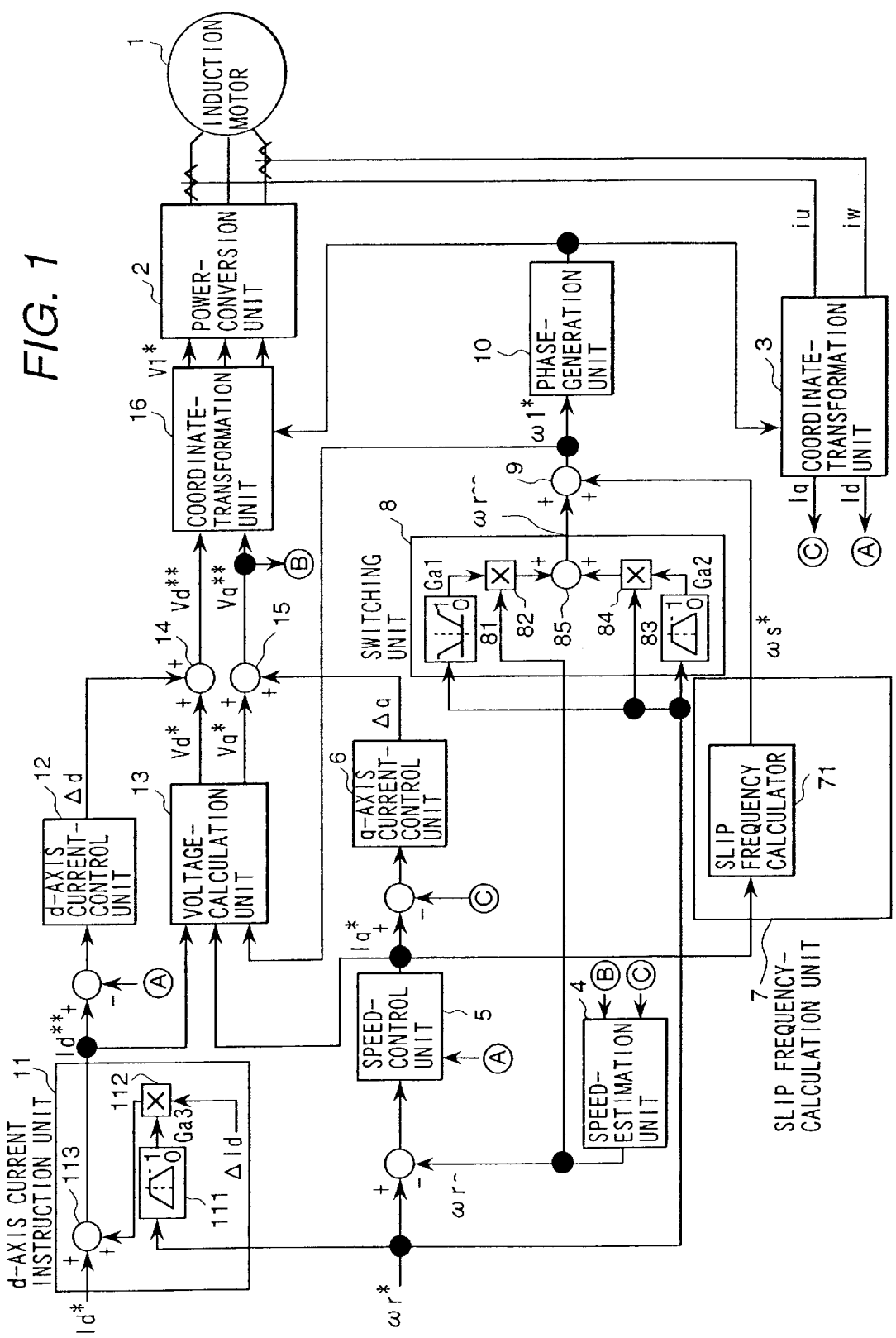
FIG. 1 is a schematic block diagram showing the circuit composition of a speed-control apparatus for an induction motor of an embodiment according to the present invention.

FIG. 1 shows the schematic circuit composition of a speed-control apparatus for an induction motor representing an embodiment according to the present invention. The apparatus includes an induction motor 1, a power-conversion unit 2 for outputting output voltages proportional to voltage instruction values V1*, and a coordinate-transformation unit 3 for transforming the coordinates of output currents iu and iw and calculating d-axis and q-axis currents Id and Iq. A speed-estimation unit 4 is provided for calculating an estimated speed $\omega r\hat{}$ based on a q-axis voltage instruction value Vq** and the current Iq. A speed-control unit 5 is provided for outputting a q-axis current instruction value Iq* corresponding to a difference between a speed instruction value $\omega r\hat{}$ and the estimated speed $\omega r\hat{}$, which further includes a limiter for limiting the instruction value Iq* corresponding to the value of Id. A q-axis current-control unit 6 is provided *for outputting Δq corresponding to the values Iq* and Iq, and a slip frequency-calculation unit 7 is provided, in which a slip frequency calculator 71 is included for obtaining a calculated slip frequency based on the value Iq*. A switching unit 8 is provided, which includes a multiplier 82 for multiplying $\omega r\hat{}$ by the output Ga1 of a function generator 81, a multiplier 84 for multiplying $\omega r\hat{}$ by the output Ga2 of a function generator 83, and an adder 85 for summing the outputs from both the multipliers 81 and 84, for switching its output $\omega r\hat{}\hat{}$ between $\omega r\hat{}$ and $\omega r^*$ corresponding to the value of the speed. An adder 9 is provided for obtaining a signal $\omega 1\hat{}$ by summing the output signal $\omega r\hat{}\hat{}$ of the switching unit 8 and $\omega s^*$, and a phase-generation unit 10 is provided for outputting a phase reference value θ by integrating the output frequency instruction value $\omega 1^*$ of output from the adder 9. A d-axis current instruction unit 11 is provided, including a multiplier 112 for multiplying an additional current value ΔId by the output Ga3 of a function generator 111 and an adder 113 for obtaining a d-axis current instruction value Id** by summing a reference current value Id* and the output of the multiplier 111. A d-axis current-control unit 12 is provided for outputting a signal Δd corresponding to a difference between Id** and Id and a voltage-calculation unit 13 is provided for calculating d-axis and q-axis reference voltages Vd* and Vq* based on Id**, Iq*, and $\omega 1^*$. Further, adders 14 and 15 are provided for outputting Vd** by summing Vd* and Δd and a coordinate-transformation unit 16 is provided for outputting output-voltage instruction values V1* (for three phases) by transforming the coordinates of Vd and Vq.

In the above units, the units 8 and 11 are specific to this embodiment. The performances of the function generators included in the respective units 8 and 11 are as follows. The output Ga1 of the function generator 81 is 0 near the input value 0, and 1 in the range of a large input value, and vice versa as to the output Ga2 of the function generator 83. The outputs Ga1 and Ga2 are complementary to each other, which is expressed by the equation (1).

$$Ga1 + Ga2 = 1 \quad (1)$$

Therefore, the output $\omega r\hat{}\hat{}$ of the switching unit 8 is given by the equation (2).

$$\omega r\hat{}\hat{} = \omega r\hat{} \cdot Ga1 + \omega r^* \cdot Ga2 \quad (2)$$

Further, the output Ga3 of the function generator 111 is 0 if $\omega r^*$ is near 0, and 1 if $\omega r^*$ is in the range of a large value. Accordingly, Id** and Id are increased from the reference value Id* by ΔId. The gradual increase and decrease regions of Ga3 are prepared to smoothly change Id**, and an intermediate value between Id* and Id*+ΔId is output as Id**.

The operation of the induction motor control system according to this embodiment will be explained below. The operations of the units or devices 1–7, 9, 10, and 12–16 are the same as those in the conventional vector control system without a speed sensor. First, the outline of the conventional vector control system without a speed sensor will be explained.

In the conventional vector control system without a speed sensor, the speed is estimated based on the output voltage and current of the power-conversion unit 2, and the speed is controlled by feeding-back the estimated speed $\omega r\hat{}$ to the speed-control unit 5. Further, the output frequency of the power-conversion unit 2 is controlled based on the sum of the estimated speed $\omega r\hat{}$ and the calculated slip frequency $\omega s^*$. The difference between the vector control without a speed sensor and the well-known vector control with a speed sensor is that, in the vector control system without a speed sensor, the estimated speed is used in place of the speed detected by a speed sensor mounted on the induction motor 1. However, the fundamental operation is common to both the controls.

To control the current flows Id and Iq in the induction motor 1 according to the d-axis current instruction value and the q-axis current instruction value output from the speed-control unit 5, it is necessary to feed the required voltage to the induction motor 1 from the power-conversion unit 2. Therefore, the voltage-calculation unit 13 calculates the d and q-axis voltage reference values Vd* and Vq* based on the current instruction values Id** and Iq*, and the output frequency instruction value $\omega 1^*$, and the output voltage of the power-conversion unit 2 is controlled according to the calculated voltage reference values Vd* and Vq*. However, since the current flows Id and Iq agree with their instruction values due to control errors by performing only the above control, the reference voltage values Vd* and Vq* are corrected with the Δd and Δq output from the d and q-axis current-control units 12 and 6 so that the current flows Id and Iq agree with their instruction values. In this way, the slip frequency-control-type vector control is performed, and the torque of the induction motor 1 is controlled in proportion to Iq*.

In the following, the detailed operation of each unit or device will be explained.

The speed-estimation unit 4 calculates the estimated speed value $\omega r\hat{}$ based on the equation (3).

$$\omega r\hat{} = \{1/(1+T0 \cdot s)\}L2^*/(M^* - \Phi 2d)\{Vq^{**} - \omega 1^* \cdot L\sigma^* \cdot Id - (R\sigma^* + L\sigma^* \cdot s)Iq\} \quad (3)$$

where

T0: a constant of the observer;

L2*, M*: secondary and exciting inductance values (reference values);

$\Phi 2d^*$: a secondary q-axis flux (reference value);

R$\sigma$d*: a sum of primary and secondary resistance values (reference value);

L$\sigma$*: a sum of primary and secondary leakage inductance values (reference value); and $\omega 1^*$: the output frequency of the power-transformation unit 2 (instruction value).

Figure 2:
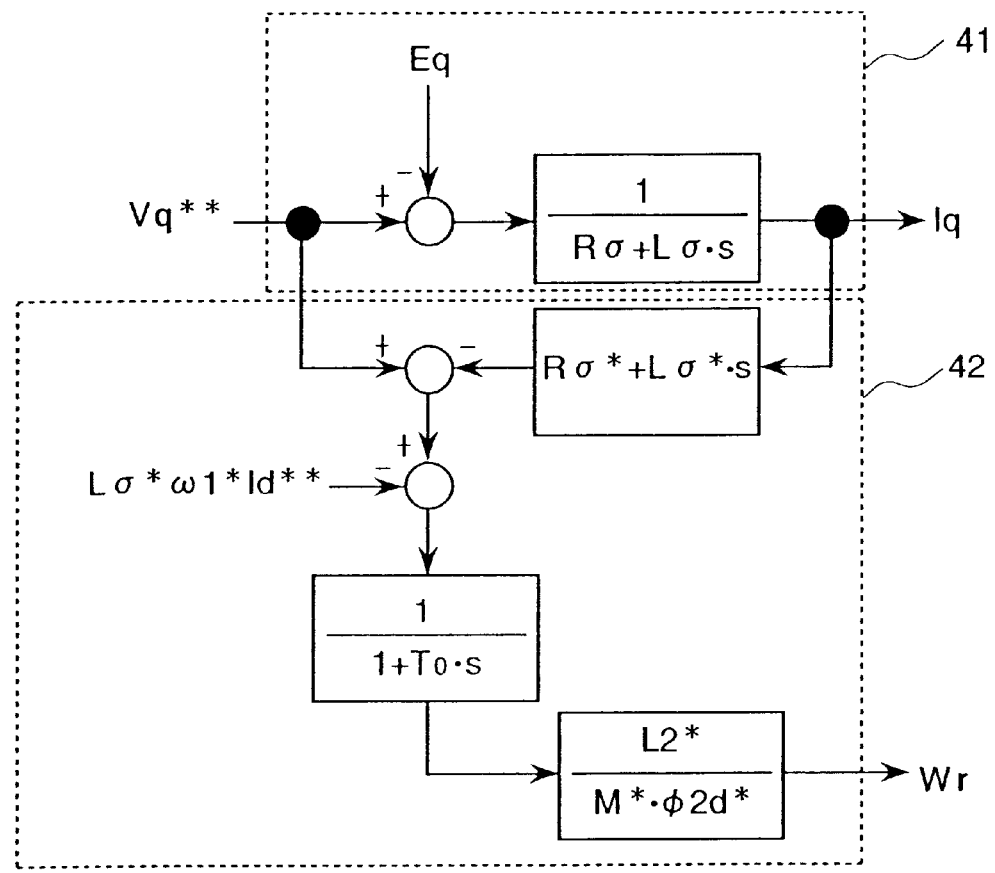
FIG. 2 is a schematic diagram showing the calculational function performed by the speed estimator in the speed-control apparatus shown in FIG. 1.

FIG. 2 shows the calculational function performed based on the equation (3) by the speed estimator 4. Reference number 41 indicates the model of the inductance motor 1, which shows the relationship among the q-axis current Vq (=Vq**) of the motor 1, the induced-electromotive force Eq, and the current Iq. In the method of estimating $\omega r^\wedge$, Eq is estimated with the inverse model of the motor 1, and $\omega r^\wedge$ obtained by dividing the estimated Eq by the reference flux.

The estimated value $\omega r^\wedge$ is used as a feed back signal to the speed-control unit 5, and for the calculation of $\omega 1^*$. The equation (4) used for the calculation of $\omega 1^*$ is shown below. In the conventional control method, $\omega r^\wedge$ is directly used as the output frequency reference value $\omega 1^*$ to control the output frequency of the power-conversion unit 2.

$$\omega 1^* = \omega r^\wedge + \omega s^* \quad (4)$$

In the speed-control unit 5, the q-axis current instruction value Iq* is calculated corresponding to the speed deviation ($\omega r^* - \omega r^*$). Since the torque of the motor 1 is basically proportional to Iq*, the speed is controlled such that $\omega r^*$ agrees with $\omega r^\wedge$. In order that the torque of the motor 1 is precisely proportional to Iq*, it is required that the current value Iq of the motor 1 agrees with Iq*, and the flux in the motor 1 is kept at the reference value. To attain the above conditions, it is necessary to control the current values Id and Iq of the motor 1 so as to agree with the respective instruction values Id** and Iq*. To implement the above control, the d and q-axis current-control units 12 and 6 are equipped. Although the voltage values Vd and Vq of the motor 1 under various operational conditions are expressed by the equations (5), the reference voltage values Vd* and Vq* corresponding to Vd and Vq can be calculated in advance with the equations (6) using Id**, Iq*, $\omega 1^*$, and the characteristic parameters of the motor 1. This calculation is performed by the voltage-calculation unit 13.

$$Vd = r1 \cdot Id - \omega 1 \cdot L\sigma \cdot Iq$$

$$Vq = r1 \cdot Iq + \omega 1 \cdot L\sigma \cdot Id + \omega 1 (M/L2) \Phi 2d \quad (5),$$

where r1: a primary resistance value (actual value);

L$\sigma$: a sum of primary and secondary leakage inductance values (actual value);

L2, M: secondary and exciting inductance values (actual values); and $\Phi 2d$: a secondary q-axis flux (reference value).

$$Vd' = r1^* \cdot Id^{**} - \omega 1^* \cdot L\sigma^* \cdot Iq^*$$

$$Vq^* = r1^* \cdot Iq^* + \omega 1^* \cdot L\sigma^* \cdot Id^{**} + \omega 1^* (M^*/L2^*) \Phi 2d^* \quad (6)$$

where * and ** indicate a reference value and an instruction value, respectively.

The output voltage of the power-conversion unit 2 (the voltage in the motor 1) is basically controlled according to Vd* and Vq*. If a control error exists, the actual current values Id and Iq do not agree with the respective instruction values by performing only the above control. Therefore, the adjustment signals $\Delta d$ and $\Delta q$ corresponding to the respective current deviations are obtained by the d and q-axis current-control units 12 and 6, and the output voltage of the power-conversion unit 2 is corrected based on the adjustment signals $\Delta d$ and $\Delta q$ so that Id and Iq agree with the respective instruction values. The operations which are explained up to here are common to the conventional control method.

Figure 3:
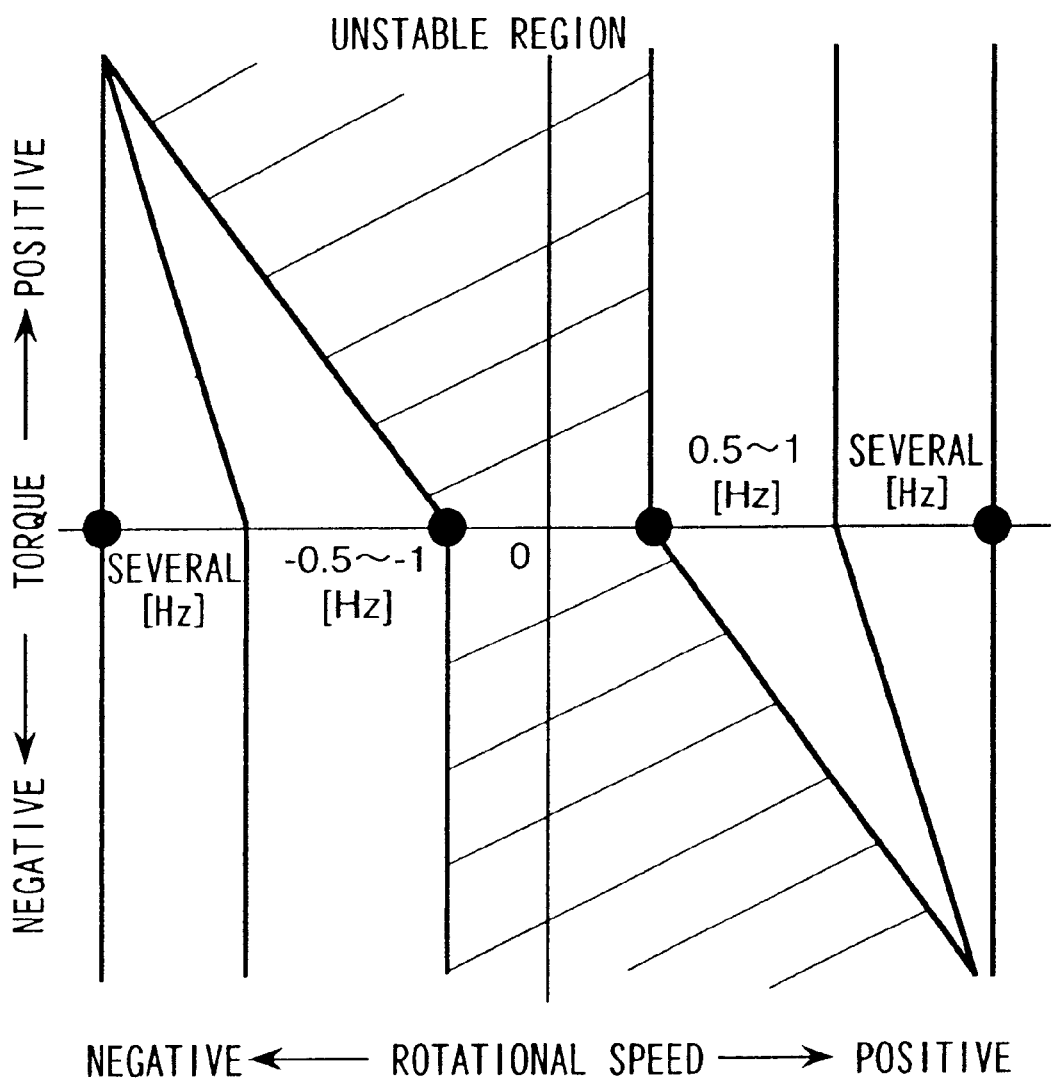
FIG. 3 is a diagram showing the relationship between the speed and the torque generated in an induction motor controlled by a conventional control method.

FIG. 3 shows the relationship between the speed $\omega r$ and the torque $\tau m$ generated in an induction motor controlled by a conventional control method in the speed range near zero. The shadowed region in this figure indicates an unstable region in which the decrease of the torque easily happens.

In the shadowed region, the range 0.5–1 Hz of speed for corresponds to an unstable area in the motoring region in which the signs of $\tau m$ and $\omega r$ are the same, and the range less than several Hz of speed cor corresponds to an unstable area in the regeneration region in which the sign of $\tau m$ is different from the sign of $\omega r$. Also, if the estimation error in $\omega r^\wedge$ obtained by the speed-estimation unit 4 increases, the shadowed region is extended, which in turn sometimes makes the on-load operation of the motor 1 at a low speed impossible.

The estimation error in $\omega r^\wedge$ is caused by changes in the temperature of the primary and secondary resistance values; changes in the leakage-inductance values due to the flux saturation in the iron core of the motor 1; etc.

Specifically, the torque of the motor 1 easily decreases in the speed range near zero due to various kinds of causes.

The control method of this embodiment, which is aimed at preventing the decrease of the torque, controls the motor 1 in the speed range near zero with a control principle different from the above conventional control method. This control principle is mentioned below.

The decrease of the torque is mainly caused by the error in the estimated speed, and two main causes bring about this error.

(1) since the frequency is controlled based on the estimated speed, the actual slip frequency is deviated from the proper value due to the estimation error.

(2) Since the speed is controlled based on the estimated speed, the estimation error makes it impossible to control the torque current at the proper value.

This embodiment seeks to solve the above problems in accordance with the following control strategies.

Strategy 1: the output frequency instruction value $\omega 1^*$ is calculated with the speed instruction value $\omega r^*$ in place of the estimated speed $\omega r^\wedge$.

That is, the output frequency of the power-conversion unit 2 is controlled according to the speed instruction value $\omega r^*$ in the speed region near zero by outputting $\omega r^*$ from the switching unit 8 in place $\omega r^\wedge$ used in the ordinary speed region.

Strategy 2: the output current of the power-conversion unit 2 is controlled at a predetermined value larger than that in the ordinary no-load operation.

For example, the q-axis current is set to zero, and the d-axis current is controlled at a predetermined value larger than that in the ordinary no-load operation. In this control, $\Delta Id$ is added to the reference value by the d-axis current instruction unit 11 so as to control the current Id at a larger value.

In the case when the strategies 1 and 2 are adopted, the relationship between the torque generated by the motor 1 and the current I1 is shown in the equation (7).

$$\tau m = K(\omega s \cdot T2)/(1+(\omega s \cdot T2)^2) I1^2 \qquad (7),$$

where

K: a proportional constant;

ωs: the slip frequency;

T2: a secondary time constant; and

I1: the primary current in the motor 1.

If I1 is constant, the torque Tm generated by the motor 1 is maximum when ωr·T2=±1, and τm changes corresponding to the value of ωs between 0 and ±1. The slip frequency ωr changes corresponding to changes in the actual speed ωr in response to the output frequency ω1(=(ωr*). That is, since ωr increases or decreases corresponding to the increase or decrease of a load torque, the torque is generated following a load torque. Consequently, the speed ωr of the motor 1 is kept near ωr* (deviates by a slip). Thus, the speed is controlled according to the speed instruction value.

Here, since the maximum torque of the motor 1 is required to be larger than the maximum load-torque, it is necessary to control I1 so as to be a value larger than that corresponding to the maximum load-torque. Therefore, Id or Iq is controlled to attain such a value.

Although Id or Iq can be set to the predetermined value independent of the speed deviation, since detecting the direction of the load torque based on the estimated speed ωr^ is difficult because of the bad estimation accuracy of speed ωr^ in the speed range near zero, the polarity of Iq* cannot be set. Therefore, a method of setting Id to the predetermined value, for which setting of the polarity is not necessary, is used in the embodiment shown in FIG. 1**. In this method, as mentioned in Strategy 2, Iq* is set to 0, and Id** is set to the sum of the reference value Id* in the ordinary speed region and ΔId to control Id (corresponds to I1) such that Id corresponds to the maximum load-torque.

In the speed range near zero, since the output frequency and current of the power-conversion unit 2 are controlled as mentioned above, the above problems (1) and (2) are solved, which in turn solves the problem of the shortage in torque.

Figure 4:
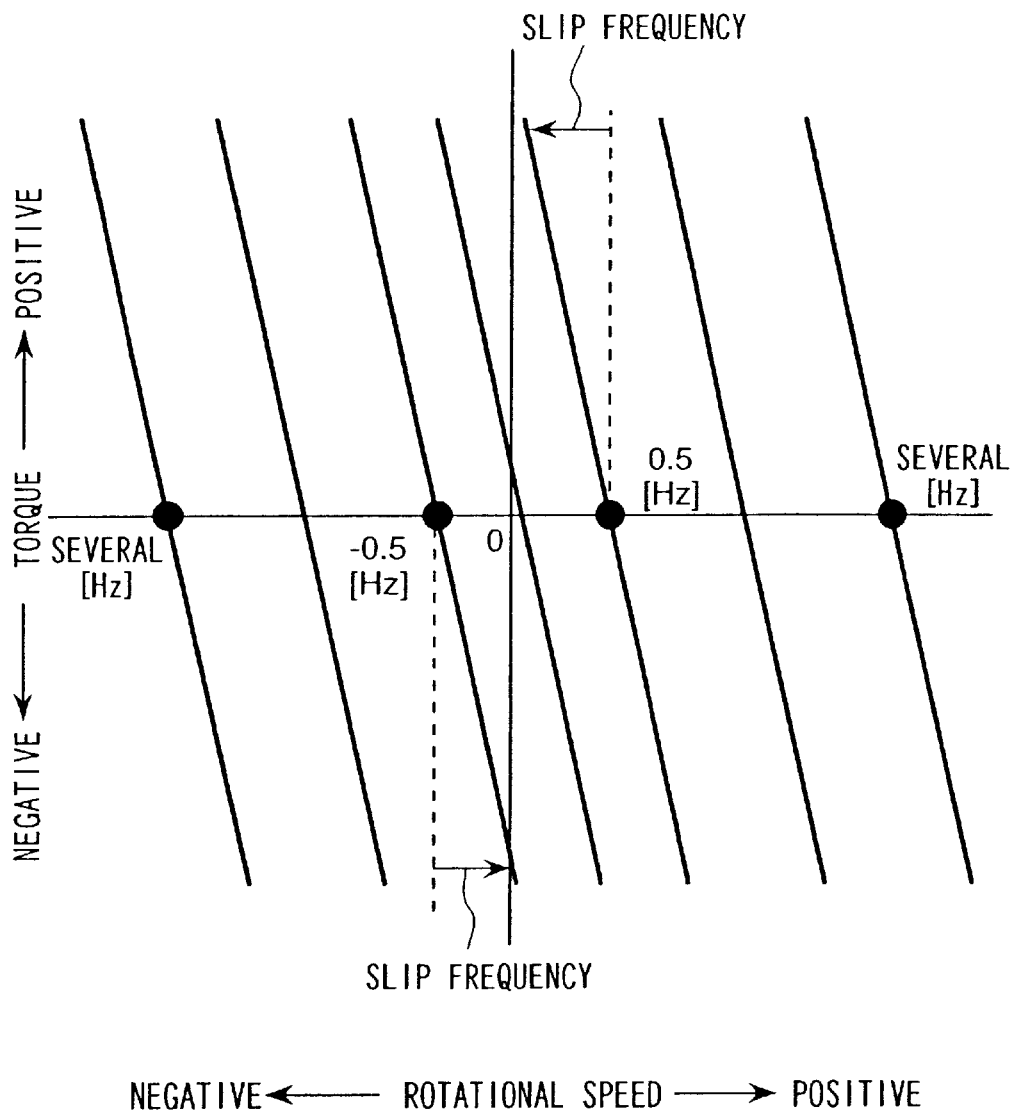
FIG. 4 is a diagram showing the relationship between the speed and the torque generated in an induction motor controlled by an apparatus using the control method according to the present invention.

FIG. 4 shows the relationship between the speed and the torque generated by the induction motor 1 in this embodiment. The unstable region (shadowed region) shown in FIG. 3 disappears in FIG. 4. Although the speed changes by a slip frequency, a high torque value can be achieved even in the speed region including and near zero.

In the regions corresponding to frequency values less than negative several Hz and more than positive several Hz, the output or the switching unit 8 shown in FIG. 1 is switched from ωr* to ωr^, and the frequency is controlled using the estimated speed by the same method as that in the conventional control. Moreover, to smoothly switch the output of the switching unit 8, the switching between ωr* and ωr^ is gradually performed so as to prevent a rapid change due to the switching ω1*. The gradual increase and decrease characteristics for the outputs Ga1 and Ga2 of the function generators 81 and 82 are prepared to implement the above objective. Also, in the d-axis current-instruction unit, The gradual increase and decrease characteristics for the output Ga3 are prepared to prevent a rapid change in Id*. Further, in the operational state in which Id should be enhanced (the speed region near zero), since it is necessary to restrict Id* such that the current I1 in the motor 1 does not exceed the rated value, and Iq* deviates from the proper value due to the degradation in accuracy in the estimated speed ωr^, Iq* is required to be set to a predetermined value or almost zero. In this embodiment, the limit value IqMax of Iq* is changed corresponding to Id based on the equation (8).

$$Iq\text{MAX} = \sqrt{I1^{*2} - Id^2} \qquad (8)$$

where I1* is the setting value of current in the motor 1.

Figure 5:
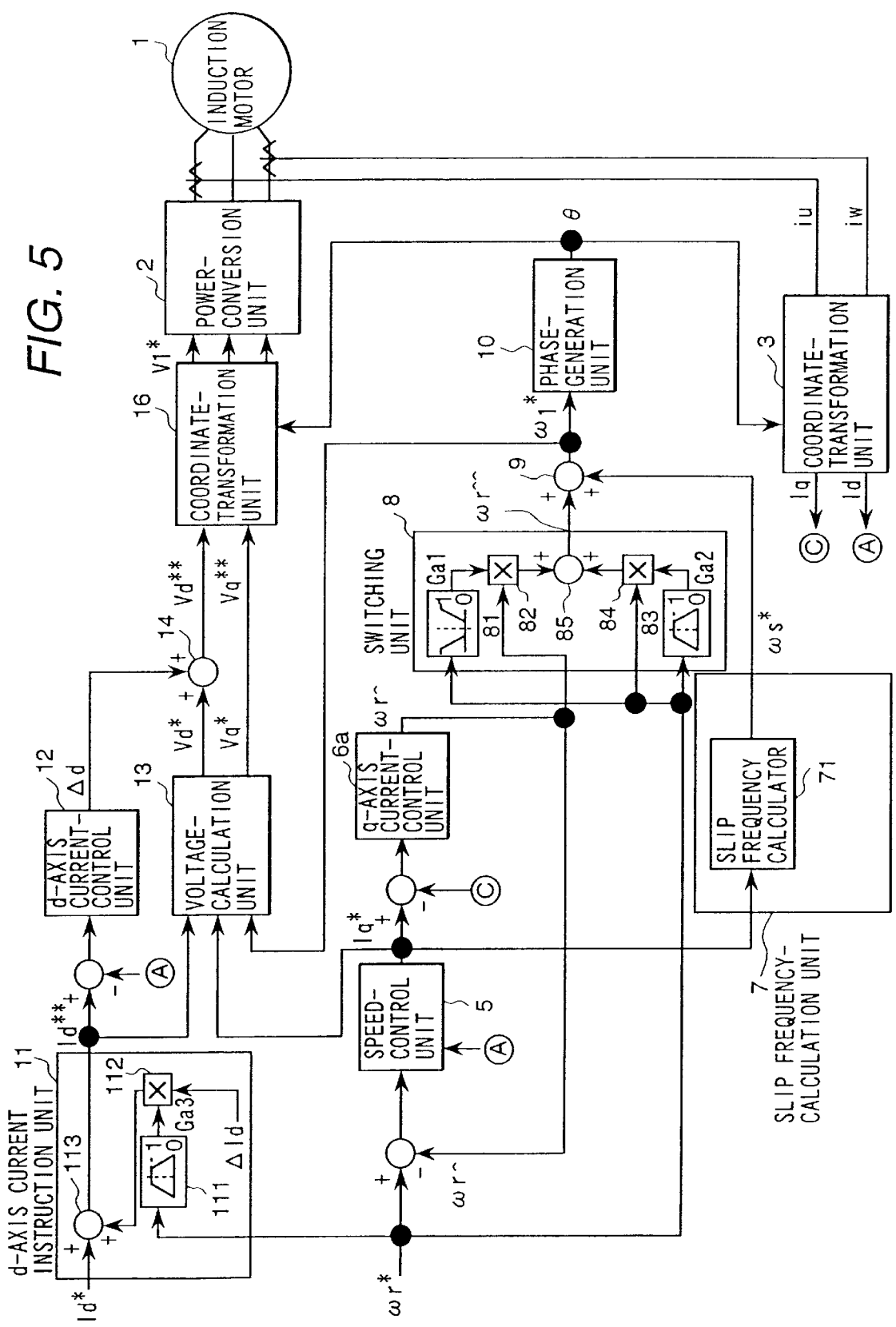
FIG. 5 is a schematic block diagram showing the circuit composition of a speed-control apparatus for an induction motor of another embodiment according to the present invention.

FIG. 5 shows a schematic block diagram of the circuit composition of a speed-control apparatus for the induction motor 1 representing another embodiment according to the present invention. This embodiment is an application example of a vector control apparatus without a speed sensor, in which the estimated speed ωr^ is obtained from the output of the q-axis current-control unit 6a. In this figure, the units or devices 1–3, 5, 7–14, and 16 are the same as those in FIG. 1. Reference number 6a indicates a q-axis current-control unit for outputting ωr^ corresponding to the deviation between Iq* and Iq, and the switching unit 8 selects and outputs one of ωr* and ωr^ depending on the value of ωr* as well as that in the previous embodiment. In the ordinary speed range, as well as in the conventional control, since ωr^ is output from the switching unit 8, and the output of the current-control unit 6a also corresponds to ωr^, it is evident that this embodiment functions in the same manner as the previous embodiment, and the same effects can be obtained.

Figure 6:
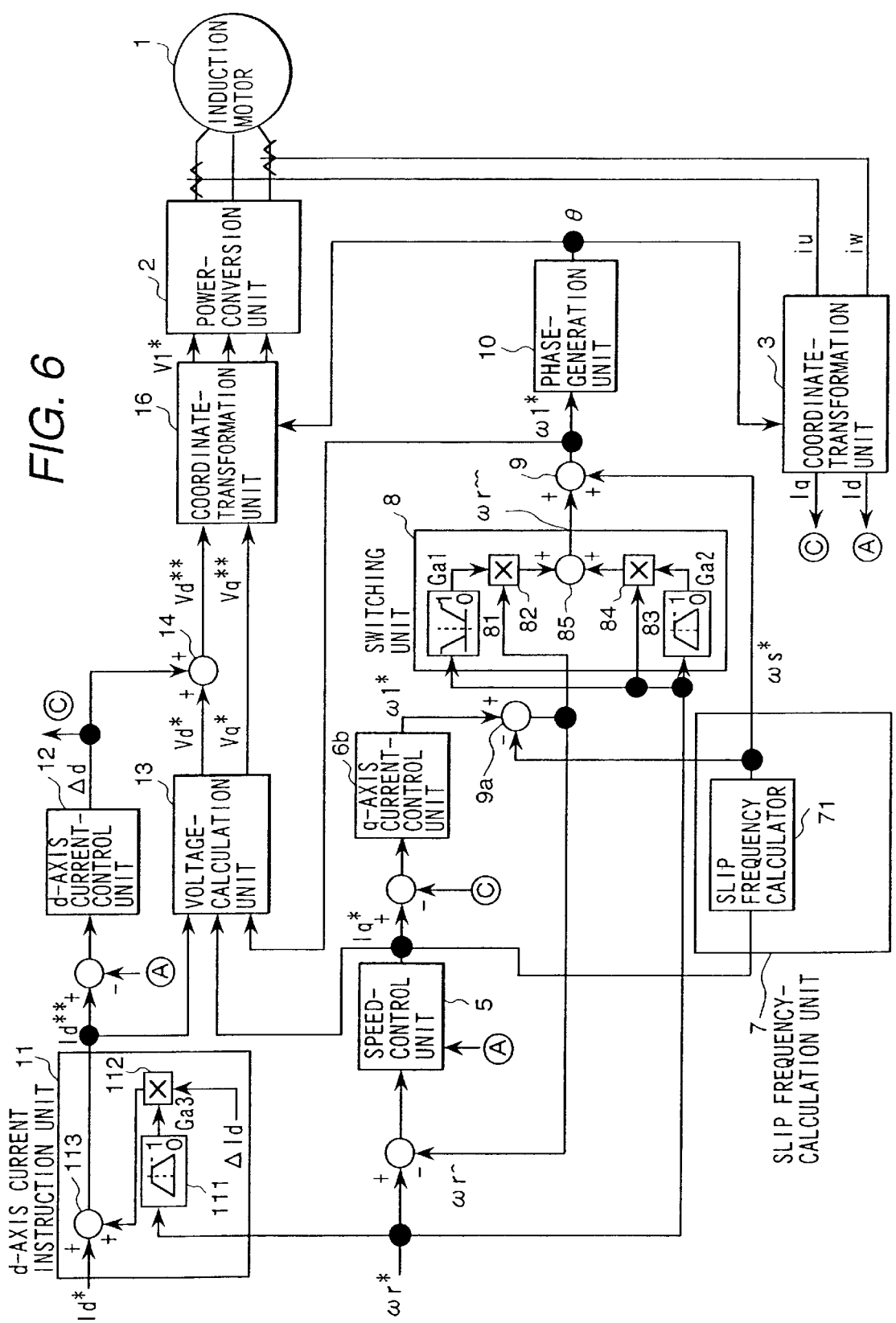
FIG. 6 is a schematic block diagram showing the circuit composition of a speed-control apparatus for an induction motor of still another embodiment according to the present invention.

Further, FIG. 6 shows a schematic block diagram of the circuit composition of a speed-control apparatus for the induction motor 1 of another embodiment according to the present invention. This embodiment is an application example of a vector control apparatus without a speed sensor, in which the estimated speed ω1* is obtained from the output of the q-axis current-control unit 6b. In this figure, the units or devices 1–3, 5, 7–14, and 16 are the same as those in FIG. 1. Reference number 6a indicates a q-axis current-control unit for outputting ω1* corresponding to the deviation between Iq* and Iq, and reference number 9a indicates a subtracter for obtaining the estimated speed ωr^ by subtracting ωr* from ω1* and for feeding back ωr^ to the speed-control unit 5. The switching unit 8 selects and outputs one of ωr* and ωr^ depending on the value of ωr* as well as that in the previous embodiment. In the ordinary speed range, as well as in the conventional control, since ωr^ is output from the switching unit 8, and the output of the current-control unit 6b also corresponds to ω1*, it is evident that this embodiment functions in the same manner as the above embodiments, and the same effects can be obtained.

Although Id is controlled to attain the predetermined enhanced value in the speed range near zero, if both the positive and negative directions of the torque possibly exist in the speed range near zero, and the direction is not fixed, the control method of this embodiment, in which Iq* is set to zero, and Id is enhanced, is suitable for this case. On the other hand, if there is only one direction of the torque, since the polarity of Iq* can be set corresponding to the direction of the torque, it is possible to set Iq* to a predetermined value (corresponds to the maximum load-torque) in place of setting Id to a predetermined value as performed in the previous embodiment in the speed range near zero.

Figure 7:
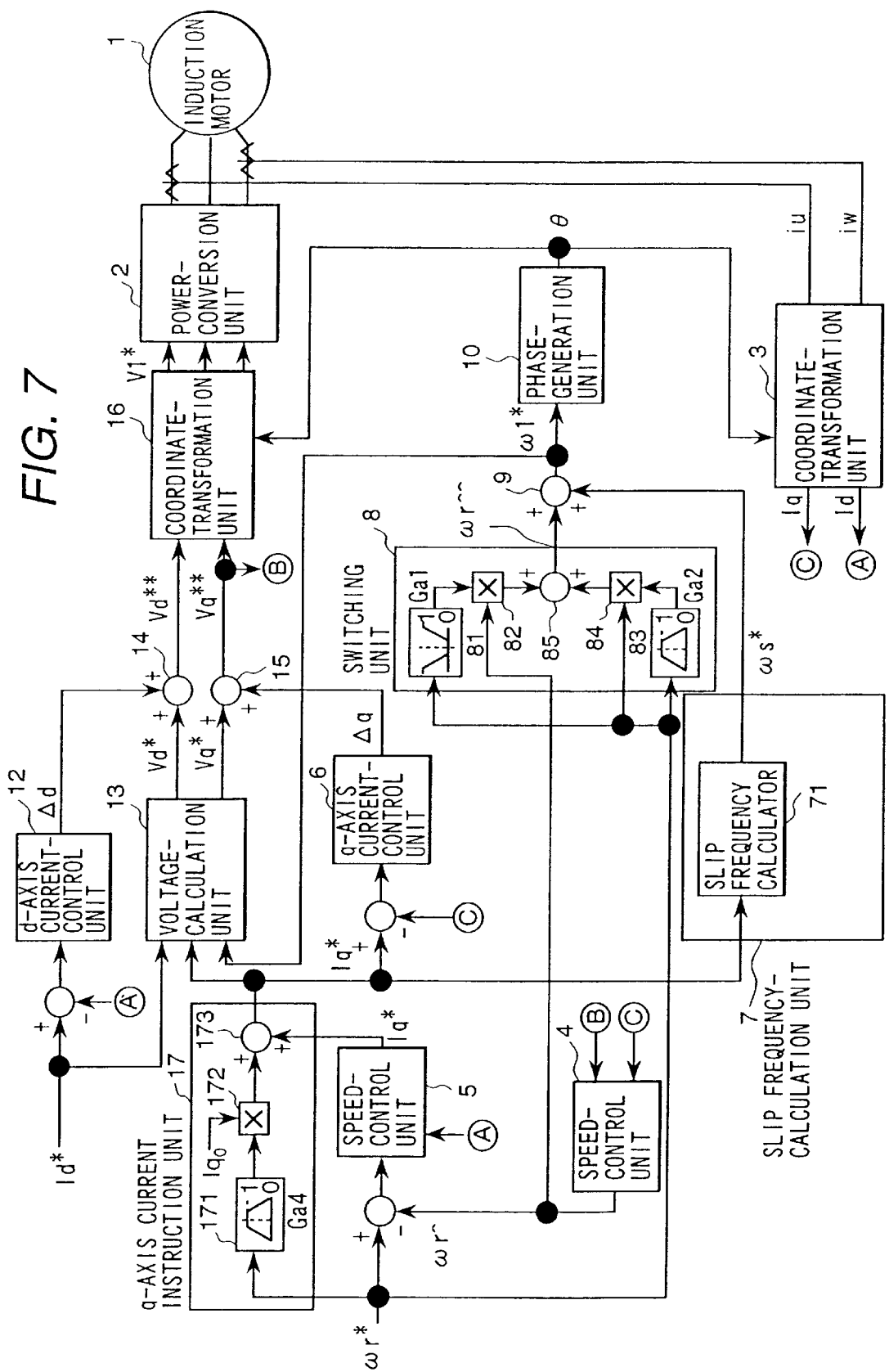
FIG. 7 is a schematic block diagram showing the circuit composition of a speed-control apparatus for an induction motor of yet another embodiment according to the present invention.

Furthermore, FIG. 7 shows a schematic block diagram of the circuit composition of a speed-control apparatus for the induction motor 1 representing another embodiment according to the present invention. In this figure, the compositions and operations of the units or devices 1–10, and 12–16 are the same as those in FIG. 1. Reference number 17 indicates a q-axis current instruction unit for outputting the sum of the set current value Iq0 which is modified depending on the value of ωr* and the output Iq* of the speed-control unit 5, and this q-axis current instruction unit 17 includes a multiplier 172 for multiplying Iq0 by the output Ga4 (0≦Ga4≦1) of a function generator 171 with the gradual increase and decrease characteristics, and an adder 173 for outputting Iq** by adding Iq* to the output of the multiplier 172.

The operation of the q-axis current instruction unit 17 will be explained below. Since Ga4 is "1" in the speed region near zero, and possesses the gradual increase and decrease characteristics (0≦Ga4≦1) in the region other than the speed region near zero, Iq0 is output from the q-axis current instruction unit 17 in the speed region near zero. Therefore, Iq is controlled according to Iq0, and a sufficient torque can be obtained (Iq0 is set to a value which corresponds to the maximum load-torque.) On the other hand, in the region other than the speed region near zero, Iq is controlled based on Iq, which is the same as the conventional control.

In this way, in the speed range near zero, since the output frequency of the power-conversion unit 2 is controlled according to ωr*, and the current in the motor 1 is controlled based on the predetermined value Iq0, the same effects of the above embodiments can be obtained with this embodiment.

In the above embodiments, although the speed-control unit 5 is provided, and the control methods in those embodiments are applied to a speed-control method in which the torque is controlled based on Iq* or Iq output from the speed-control unit 5, the present invention can be applied to a control method which operates without the speed-control unit 5**.

Figure 8:
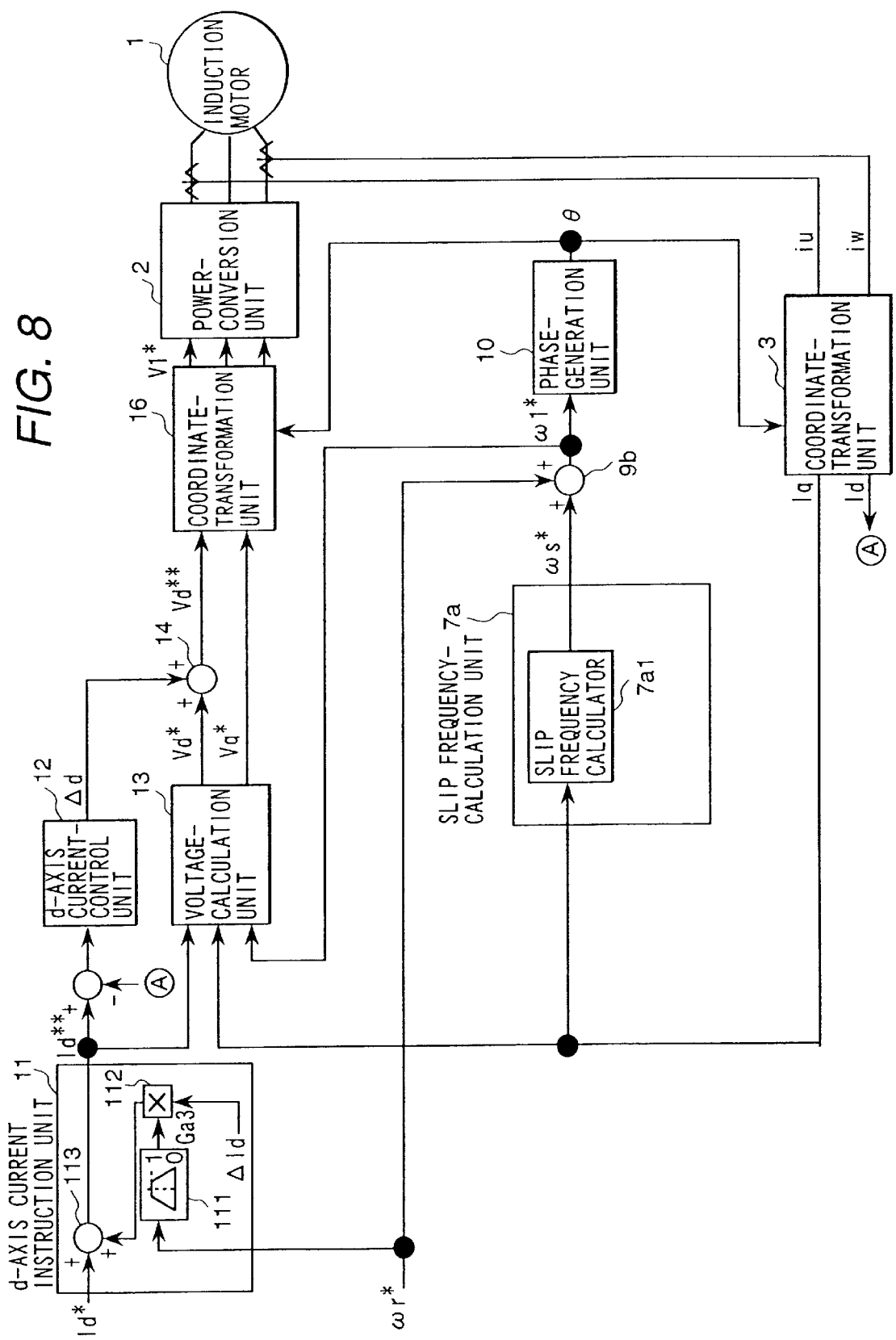
FIG. 8 is a schematic block diagram showing the circuit composition of a speed-control apparatus for an induction motor of another embodiment according to the present invention.

FIG. 8 shows a schematic block diagram of the circuit composition of a speed-control apparatus for the induction motor 1 representing another embodiment without the speed-control unit 5. In this figure, the units or devices 1–3, 10–14, and 16 are the same as those in FIG. 1. Reference number 7a1 indicates a slip frequency calculator for obtaining the calculated slip frequency ωs* based on the q-axis current value Iq, and reference number 9b indicates an adder for obtaining the signal ω1* by adding the speed instruction value ωr* to the signal ωr*.

The operation of the control system shown in FIG. 8 will be explained below. In the region other than the speed region near zero, the frequency instruction value ω1* (=ωr*+ωs*) is output, and the d-axis current instruction value Id is output from the d-axis current instruction unit 11. Thus, the operation of this system is the same as that of the conventional vector control without a sensor. That is, the output frequency of the power-conversion unit 2** is controlled mostly according to ωr*, and the output voltage of the power-conversion unit 2 is also controlled based on the necessary voltage of the motor 1 which is calculated based on Id**, Iq, and ω1* by the voltage-calculation unit 13.

Since the output voltage and frequency of the power-conversion unit 2 are controlled as explained above, an operation similar to that of a V/f control is performed.

However, since the induced-electromotive-force (the magnetic flux in the motor 1) is controlled so as to attain a predetermined value by compensating the internal voltage decrease in the motor 1 with the voltage-calculation unit 13 in this embodiment, a sufficient quantity of torque can be obtained to the speed range near zero.

In the speed range near zero, the d-axis current instruction unit 11 outputs the instruction value Id** obtained by adding ΔId to Id* in order to enhance Id. By this control, in this embodiment as well as the previous embodiment, the frequency instruction value ω1* is controlled according to the speed reference value ωr*, and the d-axis current is controlled so as to have a higher value than that in the ordinary speed range. Accordingly, the shortage of the torque can be eliminated.

In the above embodiments, since Iq* is controlled to be zero in the speed range near zero, ωs* is zero. Therefore, the output frequency ω1 agrees with the speed instruction value ωr*. Thus, if a load torque is applied to the motor 1, the speed ωr of the motor 1 deviates from ωr* by the slip frequency ωs. This deviation can be compensated by estimating the slip frequency using the voltage instruction values Vd and Vq in the embodiment shown in FIG. 1, or the outputs Δd and Δq of the current-control units 12 and 6, which are obtained based on the output voltage values of the power-conversion unit 2, and by adding the estimated slip frequency ωr^ to the frequency instruction value.

Further, the estimated slip frequency obtained based on the output voltage values is added to the calculated slip frequency obtained using the current instruction value Iq. Furthermore, this sum is used as a new calculated slip frequency to correct the frequency instruction value, and this makes it possible to compensate the deviation of the speed due to the load torque in the whole speed range from zero.

Figure 9:
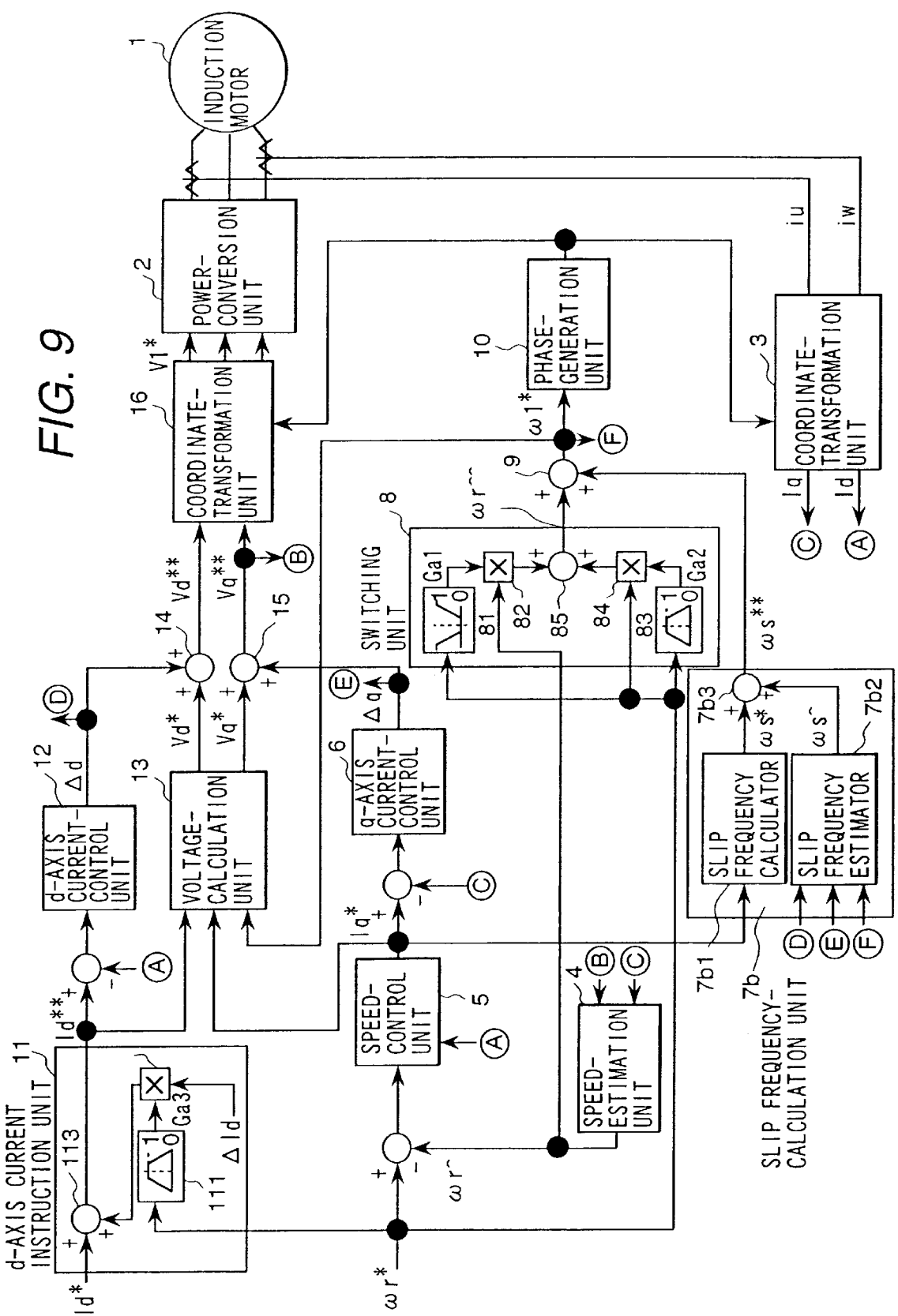
FIG. 9 is a schematic block diagram showing the circuit composition of a speed-control apparatus for an induction motor of another embodiment according to the present invention.

FIG. 9 shows a schematic block diagram of the circuit composition of a speed control apparatus for the induction motor 1 representing another embodiment which implements the above-mentioned control. This embodiment applies the above control to the vector control apparatus without a speed sensor shown in FIG. 1.

In this figure, the units or devices 1–6, and 8–16 are the same as those in FIG. 1. Reference number 7b indicates a slip frequency-calculation unit for calculating the slip frequency ωs* and the estimated slip frequency ωs^ and obtaining the sum ωs** of ωs* and ωs^. Further, there is provided a slip frequency calculator 7b1 for obtaining ωs* with the current instruction value Iq*; a slip frequency estimator 7b2 for obtaining ωs^ with the outputs Δd and Δq of the current-control units 12 and 6, and the output frequency instruction value ω1*; and an adder 7b3 for obtaining the sum of ωs* and ωs^.

Here, the output of the adder 9 agrees with (ωr*+ωs^) in the speed range near zero, and with (ωs^·Ga1+ωr*·Ga2+ ωs^)+ωs*) in the range other than the speed range near zero.

Figure 10:
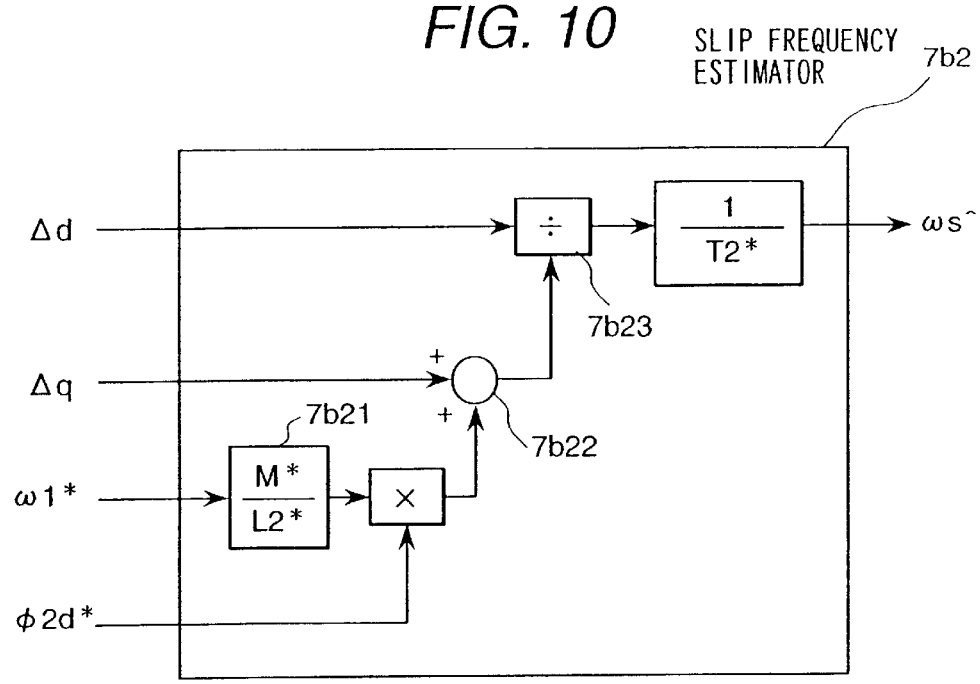
FIG. 10 is a schematic diagram showing the calculational function performed by the slip estimator in the speed-control apparatus shown in FIG. 9.

The slip frequency estimator 7b2 will be explained below. First, the composition of the estimator 7b2 will be explained with reference to FIG. 10.

The ω1* input to the estimator 7b2 is multiplied by a coefficient (M*/L2*), and further by a d-axis flux reference value Φ2d*, and the multiplication result is input to an adder 7b22 along with Δq. Furthermore, Δq and the output signal of the adder 7b22 are input to a divider 7b23. The output signal of the divider 7b23 is multiplied by the reciprocal (1/T2*) of the secondary time constant of the motor 1, and the estimated slip frequency ωs^ is output from the slip frequency estimator 7b2.

Next, the effects of this slip frequency estimator 7b2 will be explained.

The voltage instruction values Vd and Vq, and the voltage values Vd and Vq in the motor 1 are expressed by the equations (9) and (10).

$$Vd^{**}=r1^* \cdot Id^{**}-\omega1^* \cdot L\sigma^* \cdot Iq^*+\Delta d$$

$$Vq^{**}=r1^* \cdot Iq^*+\omega1^* \cdot L\sigma^* \cdot Id^{**}+\omega1^*(M^*/L2^*)\Phi2d^*+\Delta q \quad (9)$$

$$Vd=r1 \cdot Id-\omega1 \cdot L\sigma \cdot Iq-\omega1(M/L2)\Phi2q$$

$$Vq=r1 \cdot Iq+\omega1 \cdot L\sigma \cdot Id+\omega1(M/L2)\Phi2d \quad (10)$$

Here, since the equations (9)=the equations (10), the outputs of the current-control units 12 and 6 are expressed by the equations (11).

$$\Delta d=(r1-r1^*)Id-\omega 1(L\sigma-L\sigma^*)Iq-\omega 1(M/L2)\Phi 2q$$

$$\Delta q=(r1-r1^*)Iq+\omega 1(L\sigma-L\sigma^*)Id+\omega 1((M/L2)\Phi 2d -(M^*/L2^*)\Phi 2d^*) \quad (11),$$

provided that $\omega 1^*=\omega 1$, $Id^{**}=Id$, and $Iq^*=Iq$.

Since the q-axis current Iq is controlled to be zero in the speed range near zero, if Iq=0, or $L\sigma \approx L\sigma^*$, the second term is sufficiently small to be neglected in comparison with the third term in the equations (11).

Then, $\Delta d$ and $\Delta q$ in the equations (11) are expressed by the equations (12).

$$\Delta d \approx (r1-r1^*)Id-(\omega 1(M/L2)\Phi 2q$$

$$\Delta q \approx \omega 1\{(M/L2)\Phi 2d-(M^*/L2^*)\Phi 2d^*\} \quad (12)$$

Thus, $\Delta d$ almost agrees with the induced-electromotive force Ed ($=\omega 1(M/L2)\Phi 2q$) related to the q-axis flux $\Phi 2q$.

On the other hand, if the induced-electromotive force reference value $\omega 1(M^*/L2^*)\Phi 2d^*$ is added to $\Delta q$, the induced-electromotive force Ed ($=\omega 1((M/L2)\Phi 2d)$) related to the d-axis flux $\Phi 2d$ is obtained.

From the equations (12), the equation (13) is obtained.

$$\Delta q+\omega 1^*(M^*/L2^*)\Phi 2d^*=\omega 1(M/L2)\Phi 2d \quad (13)$$

Here, if Id and Iq are controlled such that Id is a predetermined value, and Iq=0, in the above method, the relationship among the fluxes $\Phi 2d$ and $\Phi 2q$, and the slip frequency $\omega s$ in the motor 1 is expressed by the equation (14).

$$\omega s = (1/T2)(-\varphi 2q/\varphi 2q)$$

$$= (1/T2)(ed/eq) \quad (14)$$

Further, by performing the calculation indicated by the equation (15), the estimated slip frequency $\omega s\hat{}$ can be obtained.

$$\omega s\hat{}=(1/T2^*)\{\Delta d/(\Delta q+\omega 1^*(M^*/L2^*)\Phi 2d^*)\} \quad (15)$$

On the other hand, in the range other than the speed range near zero, the current instruction value Iq* is generated by the speed-control unit 5. In this region, the estimated slip frequency $\omega s\hat{}$ is obtained using Iq* as shown by the equation (16).

$$\omega s\hat{}=Iq^*\cdot M/(T2^*\cdot\Phi 2d) \quad (16)$$

Here, the output frequency instruction value $\omega 1^*$ is obtained by adding the sum $\omega s^{**}$ of $\omega s\hat{}$ obtained by the equation (15) and $\omega s^*$ obtained by the equation (16) to the output $\omega s\hat{\hat{}}$ of the switching unit 8.

$$\omega 1^*=\omega r\hat{\hat{}}+\omega s^*+\omega s\hat{} \quad (17)$$

Figure 11:
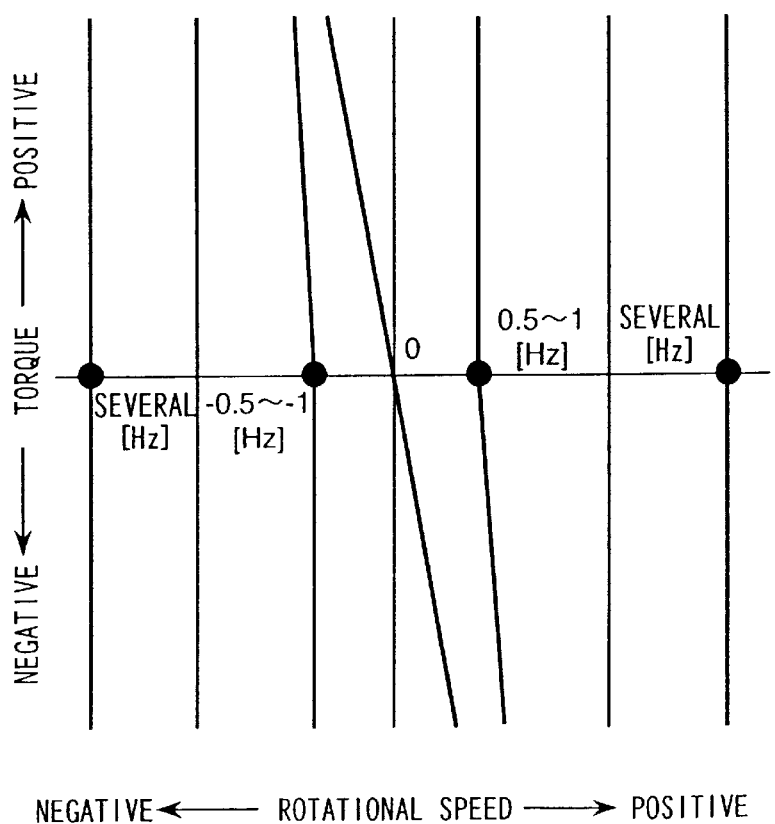
FIG. 11 is a diagram showing the relationship between the speed and the torque generated in an induction motor controlled with the slip estimator and the slip frequency-calculator according to the present invention.

FIG. 11 shows the relationship between the speed and the torque generated in an induction motor controlled using the above slip frequency-compensation method according to the present invention. By means of this slip frequency-compensation method, the deviation of the speed can be corrected corresponding to the torque from the speed range near zero ($\omega r\approx 0$), which in turn makes it possible to achieve a highly accurate speed control of the motor 1.

Moreover, although $\omega s\hat{}$ is calculated using $\Delta d$ and $\Delta q$ in this embodiment shown in FIG. 9, $\omega s\hat{}$ can also be obtained using the induced-electromotive force values ed$\hat{}$ and eq$\hat{}$ calculated from the voltage instruction values Vd and Vq.

By subtracting the resistance voltage-decrease r1·Id and the leakage inductance voltage-decrease $\omega 1\cdot L\sigma\cdot Id$ from Vd and Vq, respectively, the respective values ed$\hat{}$ and eq$\hat{}$ can be obtained as shown by the equations (18). ed$\hat{}$. Here, in the speed range near zero, Iq=0.

$$ed\hat{} = Vq^{**} - r1^* \cdot Id^* + -\omega 1^*(m^*/L2^*)\varphi 2q\hat{}$$

$$ed\hat{} = Vd^{**} - \omega 1^* \cdot L\sigma^* \cdot Id^{**}$$

$$= \omega 1^*(M^*/L2^*)\varphi 2d\hat{} \quad (18)$$

Since as is obtained by the equation (14), $\omega s\hat{}$ can be calculated by the equation (19) using $\Phi 2d\hat{}$ and $\Phi 2q\hat{}$, or ed$\hat{}$ and ed$\hat{}$.

$$\omega s\hat{} = (1/T2^*)(-\varphi 2q\hat{}/\varphi 2q\hat{})$$

$$= (1/T2^*)(ed\hat{}/eq\hat{}) \quad (19)$$

By controlling the speed according to $\omega 1$ calculated by the equation (17) using the obtained $\omega s\hat{}$ and $\omega s^*$, the same effects as those of the speed control performed based on the equation (15) can be achieved.

Although this control method is applied to the control apparatus shown in FIG. 1 in the above embodiment shown in FIG. 9, if this invention is applied to the control apparatuses shown in FIGS. 5, 6, and 8, $\omega s\hat{}$ is calculated p based on the voltage instruction value Vq* and the output $\Delta d$ of the current-control unit 12.

That is, since Vq*=Vq (the second one of the equations (6) the second one of the equations (10)), Iq=0, and the effect of leakage inductance voltage-decrease is small enough to be neglected (even if $L\sigma \approx L\sigma^*$), Vq* is expressed by the equation (20).

$$Vq^* \approx \omega 1(M/L2)\Phi 2d \quad (20)$$

Further, since $\Delta d$ is obtained by the equations (12), $\omega s\hat{}$ can be calculated by the equation (21) using $\Delta d$ and Vq*.

$$\omega s\hat{}=(1/T2^*)(\Delta d/Vq^*) \quad (21)$$

By controlling the speed according to $\omega 1$ calculated by the equation (17) using the obtained $\omega s\hat{}$ and $\omega s^*$, the same operation and effects as those of the embodiment shown in FIG. 9 which is controlled based on the equation (15) can be achieved.

Figure 12:
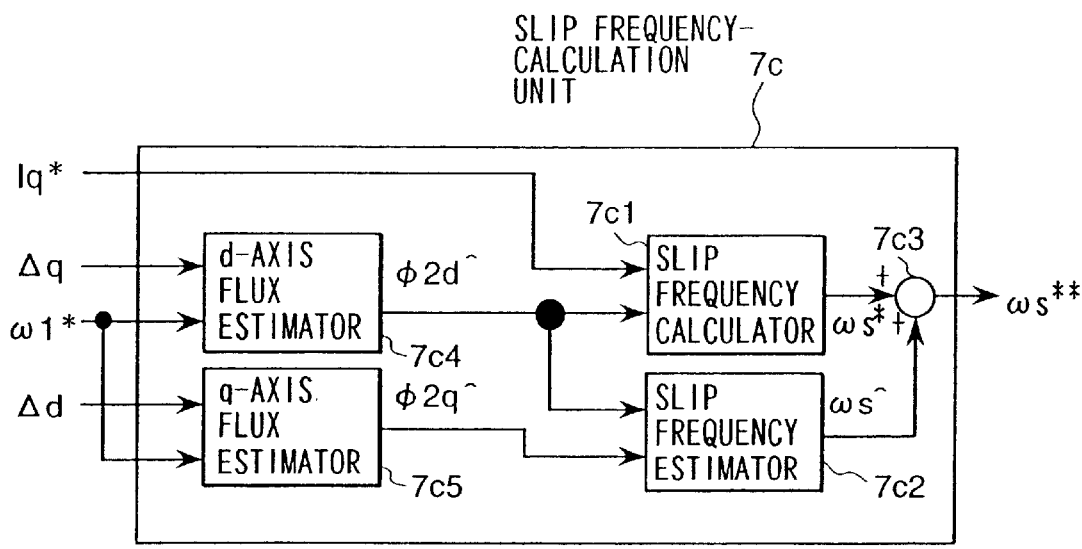
FIG. 12 is a schematic diagram showing the calculational function performed by the slip frequency-calculation unit in the speed-control apparatus shown in FIG. 9.

Although the slip frequency-calculation unit 7b shown in FIG. 9 is used in the above embodiments, the same effects as those of the above embodiment can be obtained using a slip frequency-calculation unit 7c shown in FIG. 12.

The unit 7c is the slip frequency-calculation unit for calculating the sum $\omega s^{**}$ of $\omega s^*$ and $\omega s\hat{}$, which includes a slip frequency calculator 7c1 for obtaining $\omega s^*$ using Id and $\Phi 2d\hat{}$; a slip frequency estimator 7c2 for obtaining $\omega s\hat{}$ using $\Phi 2d$ and $\Phi 2q\hat{}$; an adder 7c3 for adding $\Phi s\hat{}$ to $\omega s^*$; a d-axis flux estimator 7c4 for calculating $\Phi 2d\hat{}$ using $\Delta q$ and $\omega 1^*$; and a q-axis flux estimator 7c5 for calculating $\Phi 2q\hat{}$ using $\Delta d$ and $\omega 1^*$.

Figure 13:
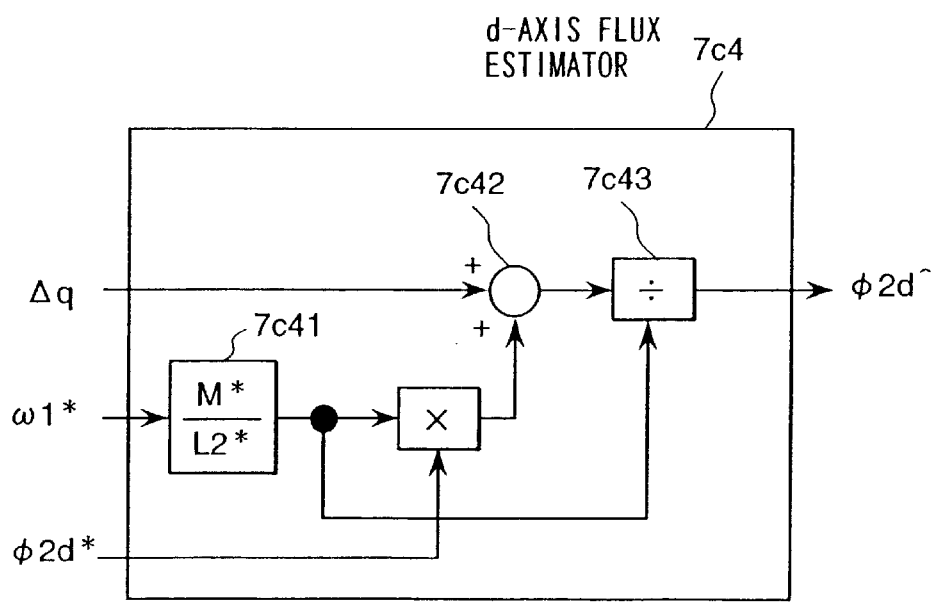
FIG. 13 is a schematic diagram showing the calculational function performed by the d-axis flux estimator in the slip frequency-calculation unit shown in FIG. 12.

First, the d-axis flux estimator 7c4, which is one of the elements composing the slip frequency-calculation unit 7c, will be explained below with reference to FIG. 13.

The $\omega 1^*$ input to the estimator 7c4 is multiplied by the coefficient $(M^*/L2^*)$, and further by the d-axis flux reference value $\Phi 2d^*$, and the multiplication result is input to the adder 7c42 along with $\Delta q$. Further, the output of the adder 7c42 and the value $\omega 1^*(M^*/L2^*)$ are input to a divider 7c43, and the divider 7c43 outputs the estimated flux $\Phi 2d$.

Figure 14:
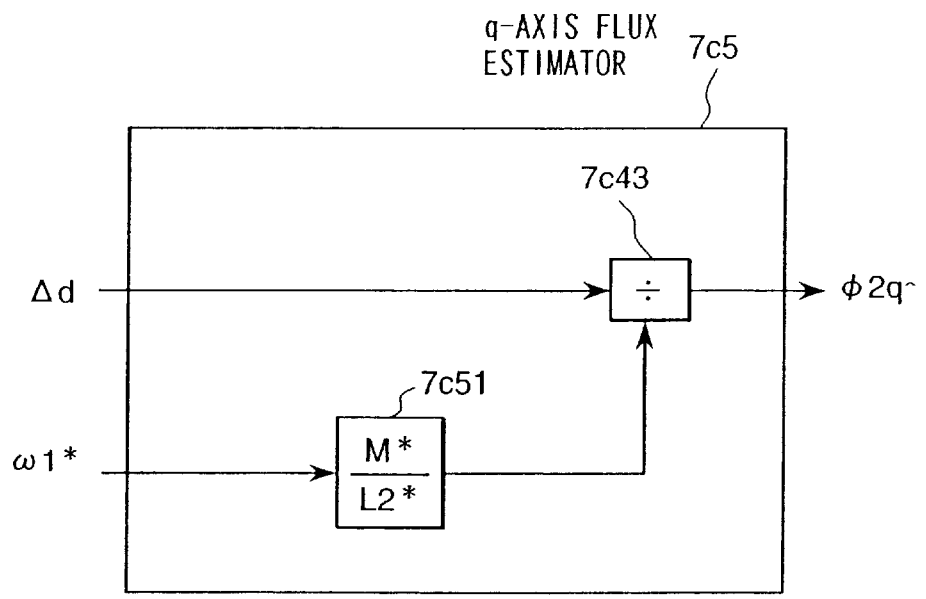
FIG. 14 is a schematic diagram showing the calculational function performed by the q-axis flux estimator in the slip frequency-calculation unit shown in FIG. 12.

Next, the q-axis flux estimator 7c5 will be explained below with reference to FIG. 14.

The ω1* input to the estimator 7c5 is multiplied by the coefficient (M*/L2*), and the multiplication result is input to the divider 7c52 along with Δd. Further, the divider 7c52 outputs the estimated flux Φ2q^.

Figure 15:
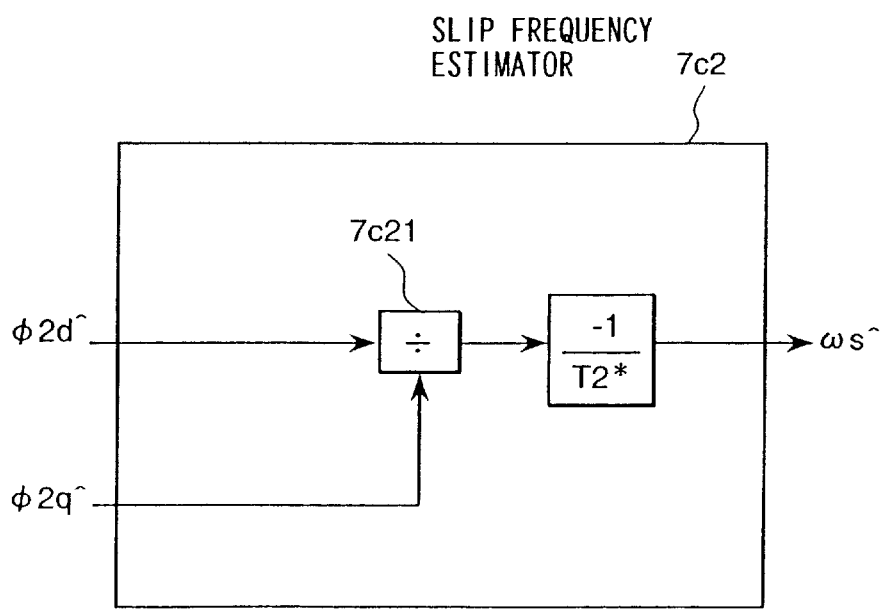
FIG. 15 is a schematic diagram showing the calculational function performed by the slip estimator in the slip frequency-calculation unit shown in FIG. 12.

The composition of the slip frequency estimator 7c2 for calculating ωs^ using the calculated Φ2d and Φ2q is shown in FIG. 15.

The estimated values Φ2d^ and Φ2q^ input to the slip frequency estimator 7c2 are input to a divider 7c21.

The output signal of the divider 7c21 is multiplied by the reciprocal (I/T2*) of the secondary time constant of the motor 1, and the estimator 7c2 outputs the estimated slip frequency ωs^. Further, the frequency instruction value is corrected with the obtained ωs^ and ωs*.

In this control method, the estimated fluxes Φ2d and Φ2q are obtained by the equations (22) based on the output voltage values, and ωs^ and ωs* are further calculated using the estimated fluxes Φ2d^ and Φ2q^ as shown by the equations (23). Thus, the speed is controlled according to ω1* which is calculated based on the equations (17) using the obtained values ωs^ and ωs*.

$$\Phi 2d = [\{\Delta q + \omega 1^*(M^*/L2^*)\Phi 2d^*\}/(\omega 1^* M^*/L2^*)]$$

$$\Phi 2q = \{\Delta q/(\omega 1^* M^*/L2^*)\} \quad (22)$$

$$\omega s = (1/T2^*)(-\Phi 2q/\Phi 2d^{\hat{}})$$

$$\omega s^* = Iq^* \cdot M^*/(T2^* \cdot \Phi 2d^{\hat{}}) \quad (23)$$

In this control method also, the same operation and effects as those of the embodiment shown in FIG. 9 which is controlled based on the equation (14) can be achieved.

Figure 16:
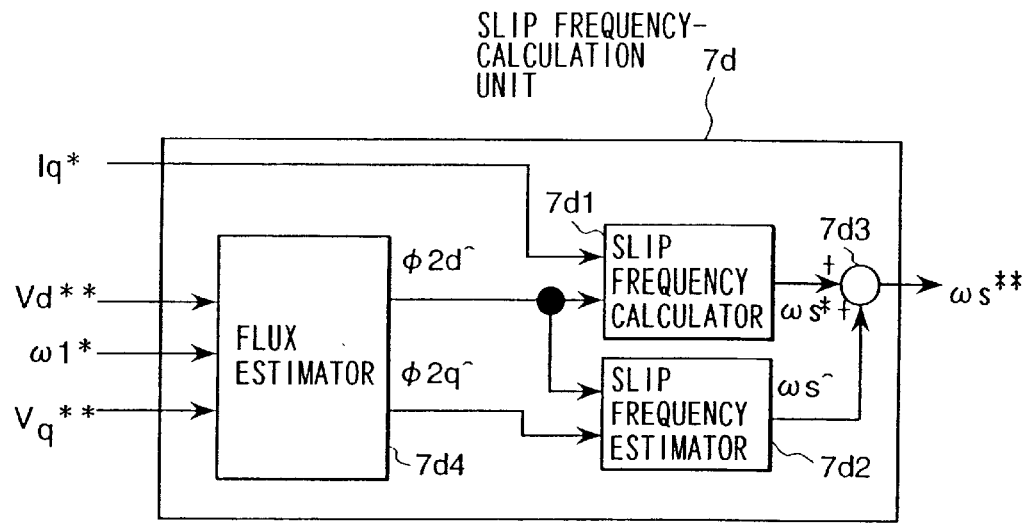
FIG. 16 is a schematic diagram showing the calculational function performed by another example of the slip frequency-calculation unit in the speed-control apparatus shown in FIG. 9.

Further, by using a slip frequency-calculation unit 7d shown in FIG. 16 in place of the slip frequency-calculation unit 7b shown in FIG. 9, the same effects can also be obtained.

The unit 7d is a slip frequency-calculation unit for obtaining the sum ωs** of ωs* and ωs^, which includes a slip frequency calculator 7d1 for obtaining ωs* using Iq* and Φ2d^; a slip frequency estimator 7d2 for obtaining (s using Φ2d^ and Φ2q^; an adder 7d3 for adding ωs^ to ωs*; and a flux estimator 7d4 for calculating Φ2d^ and Φ2q^ using Vd and Vq, and ω1*.

Figure 17:
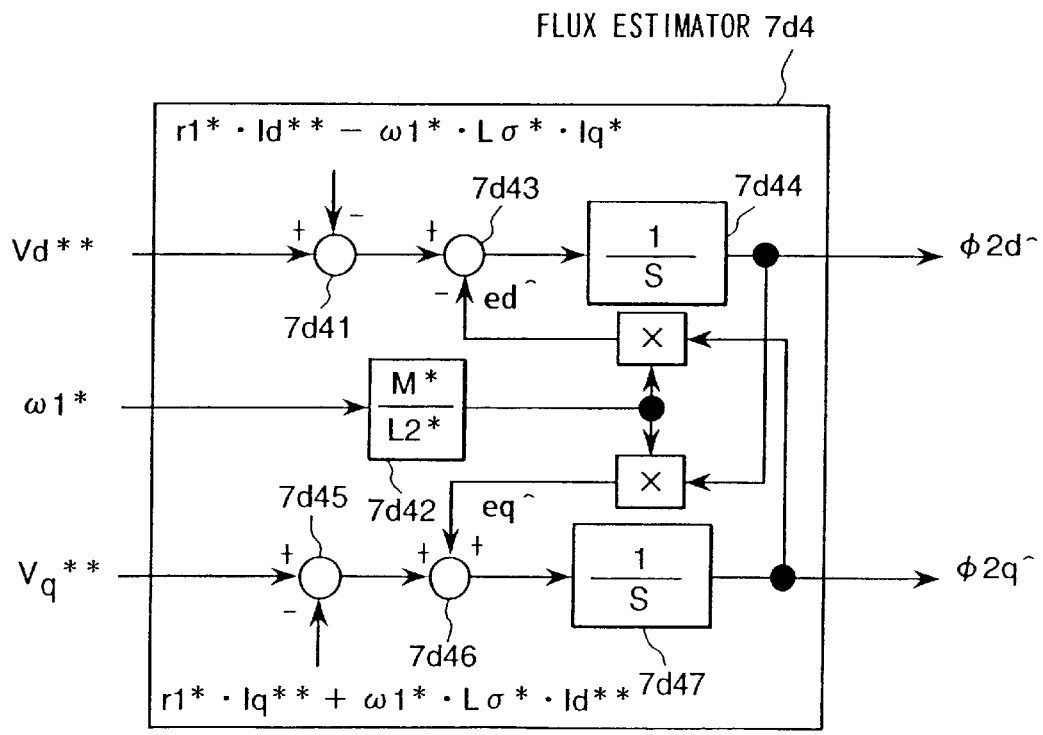
FIG. 17 is a schematic diagram showing the calculational function performed by the flux estimator in the slip frequency-calculation unit shown in FIG. 16.

The composition of the flux estimator 7d4, which is one of elements composing the unit 7d, is shown in FIG. 17.

Vd**, the calculated resistance voltage-decrease value (r1*·Id*), and the calculated leakage inductance voltage-decrease value (−ω1*·Lσ*·Iq*) are input to a subtracter 7d41. Further, by multiplying ω1* by the coefficient (M*/L2*), and further by Φ2q, the estimated d-axis induced-electromotive force ed^ is obtained. The obtained value ed^ is input to a subtracter 7d43 along with the output signal of the subtracter 7d41. Furthermore, the output signal of the subtracter 7d43 is input to an integrator 7d44, and the estimated flux Φ2d^ is output from the integrator 7d44.

Also, Vq**, the calculated resistance voltage-decrease value (r1*·Iq*), and the calculated leakage inductance voltage-decrease value (−ω1*·Lσ*·Id**) are input to a subtracter 7d45.

Further, by multiplying ω1* by the coefficient (M*/L2*), and further by ω2d^, the estimated q-axis induced-electromotive force eq^ is obtained. The obtained value eq^ is input to a subtracter 7d46 along with the output signal of the subtracter 7d45. Furthermore, the output signal of the subtracter 7d46 is input to an integrator 7d47, and the estimated flux Φ2q is output from the integrator 7d47.

In this speed control method, Φ2d and Φ2q are obtained by the equations (24) based on the output voltage, and ωs^ is then calculated.

$$\Phi 2d^{\hat{}} = \int [Vd^{**} - r1 \cdot Id^* + \omega 1^* \cdot L\sigma^* \cdot Iq^* - \omega 1^*(M^*/L2^*)\Phi 2q^{\hat{}}]dt$$

$$\Phi 2q^{\hat{}} = \int [Vq^{**} - r1 \cdot Iq^* + \omega 1^* \cdot L\sigma^* \cdot Id^* + \omega 1^*(M^*/L2^*)\Phi 2d^{\hat{}}]dt \quad (24)$$

That is, Φ2d^ and Φ2q^ are obtained with the flux estimator 7d4 using the voltage instruction values Vd and, and Vq, and the calculator 7d1 and the estimator 7d2 shown in FIG. 16 calculate ωs* and ωs^, respectively, according to the equations (23). Further, the adder 7d3 adds ωs* to ωs^, and the frequency instruction value ω1* is corrected with the sum ωs^^.

In this control method also, the same operation and effects as those of the embodiment shown in FIG. 9 can be achieved.

Meanwhile, the respective calculational functions of the calculator 7d1 and the estimator 7d2 are the same as those of the calculator 7c1 and the estimator 7c2.

In the above embodiments, the d-axis current Id is controlled to be constant independent of the load torque, but the operational efficiency deteriorates in an operation with light load-torque. Here, the operational efficiency in the operation with light load-torque can be improved by correcting the current instruction value Id**, corresponding to an estimated torque τm^.

Figure 18:
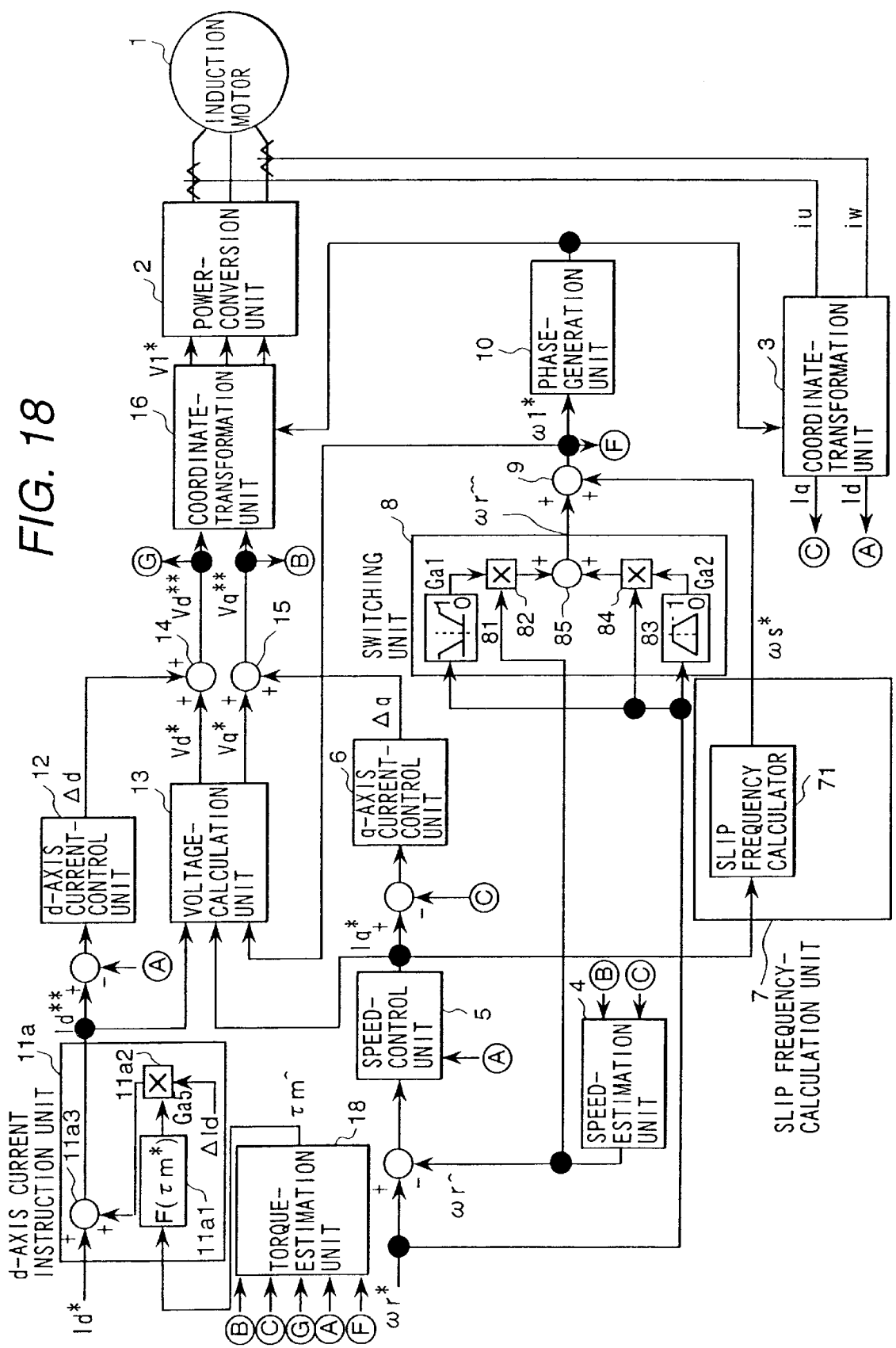
FIG. 18 is a schematic block diagram showing the circuit composition of a speed-control apparatus for an induction motor of another embodiment according to the present invention.

FIG. 18 shows the circuit composition of a speed-control apparatus for an induction motor of an embodiment in which this speed control method is used. In this embodiment, the above q-axis current-correction method according to this control method is applied to the control apparatus shown in FIG. 1.

In this figure, the units or devices 1–10, and 12–16 are the same as those in FIG. 1. Reference number 18 indicates a torque estimator for calculating the output torque of the motor 1 based on the voltage instruction values Vd and Vq, the detected current values Id and Iq, and the frequency instruction value ω1*.

The output signal τm^ is input to a function generator 11a1 in the d-axis current instruction unit 11a. The function generator 11a1 calculates a correction gain Ga5 (0≦Ga5.≦1) based on the output signal τm^.

In a multiplier 11a1, the increment ΔId* of the current instruction value is multiplied by the above Ga5. Further, Id** is obtained by adding Id* to the result of the multiplication, and the sum is output from the d-axis current instruction unit 11a. Next, a torque estimator 18 will be explained. The estimator 18 performs the calculation shown by the equation (25) based on Vd and Vq, Id and Iq, and ω1*.

$$\tau m^{\hat{}} = (Vd^{} \cdot Id + Vq^{} \cdot Iq)/\omega 1^* \quad (25)$$

Id** which corresponds to the load torque is calculated according to the equation (26) using τm^ obtained by the above equation (25).

$$Id^{**} = Id^* + F(\tau m^{\hat{}}) \cdot \Delta Id^* \quad (26),$$

provided that the output Ga5 of F(τm^) is as follows: that is;

if |τm^|=0, then Ga5 0, and if |τm^|≈0, then 0<Ga5≦1.

The value of Id according to the equation (26) is as follows:

without a load (|τm^|=0), Id**=Id*, and with a load (|τm^|>0), Id**>Id*.

Thus, since Id** is corrected corresponding to the load torque, the operational efficiency in an operation with a light load can be increased.

Although this control method is applied to the control apparatus shown in FIG. 1, if it is applied to the respective control apparatuses shown in FIGS. 5, 6, and 8, τm^ is calculated by the equation (27) using the voltage instruction reference value Vq* in place of the voltage instruction value Vq**.

$$\tau m\hat{} = (Vd^{**} \cdot Id + Vq^* \cdot Iq)/\omega 1^* \qquad (27)$$

By calculating Id** which changes corresponding to the load torque with the τm^ calculated according to the above equation, the same operation and effects as those of the above embodiments can be achieved.

Moreover, although the estimated torque τm^ is calculated by using vd and Vq, and Id and Iq in this embodiment, it is possible to obtain τm^ according to the equation (28) using the estimated fluxes Φ2d^ and Φ2q^.

$$\tau m\hat{} = K1(\Phi 2d\hat{} \cdot Iq - \Phi 2q\hat{} Id) \qquad (28),$$

where K: a torque constant.

By calculating Id** which changes corresponding to the load torque with τm^ calculated according to the above equation, the same operation and effects as those of the above embodiments can be achieved.

Further, although the operational efficiency in an operation with a light load is improved by correcting Id, corresponding to τm^, the same effects can be obtained using the calculated slip frequency ωs** in place of τm^.

Figure 19:
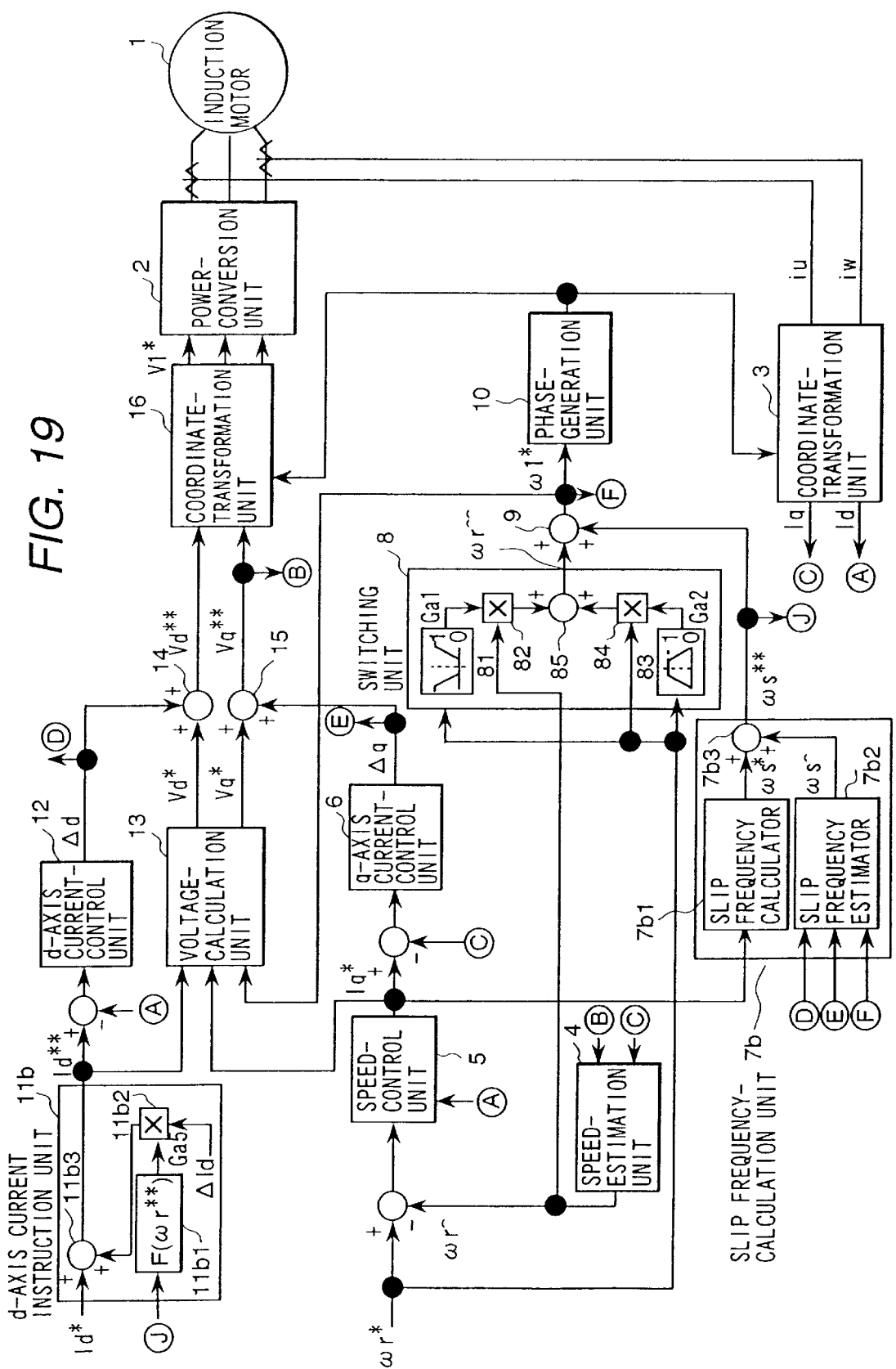
FIG. 19 is a schematic block diagram showing the circuit composition of a speed-control apparatus for an induction motor of another embodiment according to the present invention.

FIG. 19 shows a schematic block diagram of the circuit composition of a speed-control apparatus for an induction motor of this embodiment. This embodiment is an example of a control method for correcting Id by using ωs, which is applied to the apparatus shown in FIG. 1.

In this figure, the units or devices 1–10, and 12–16 are the same as those in FIG. 7. Reference number 11b indicates a d-axis current instruction unit for calculating the gain Ga6 corrected with ωs**.

The calculated slip frequency ωs** is input to a function generator 11b1 in the instruction unit 11b. The function generator 11b1 calculates the gain Ga6 (0≦Ga6≦1) to be corrected.

A multiplier 11b2 multiplies the gain Ga6 by the increment ΔId. Further, Id is obtained by adding the result of the multiplication to Id*, and the sum is output from the current instruction unit 11b.

Next, the effects of the d-axis current instruction unit 11b which is one of the main features of the present invention will be explained below. The calculated slip frequency is proportional to the torque.

Accordingly, if Id is controlled using ωs** in accordance with the equation (29), the same effects as those of the above embodiments can be obtained.

$$Id^{**} = Id^* + F(\omega s^{**}) \cdot \Delta Id^* \qquad (29)$$

provided that the output Ga6 of F(ωs**) is as follows: that is;

if |ωs**|=0, then Ga6 0, and
if |ωs**|>0, then 0<Ga6≦1.

If Id obtained by the equation (29) is used,
without a load (|ωs|=0), Id=Id*, and
with a load (|ωs|>0), Id>Id*.

Thus, since Id is corrected corresponding to the load torque (ωs**), it is apparent that the same operations and effects as the above embodiments can be obtained.

Although this control method is applied to the control apparatus shown in FIG. 1, if it is applied to the respective control apparatuses shown in FIGS. 5, 6, and 8, ωs^ is obtained by the equation (21) using the ratio of Δd to Vq*, and by correcting Id corresponding to the sum ωs of ωs^ and ωs*, the same operations and effects as the above embodiments can be obtained.

In accordance with the present invention, it is possible to provide an apparatus using a speed-control method for an induction motor, which does not cause a shortage in the torque in the speed range near zero.

We claim:

1. A rotational speed-control apparatus to control an induction motor, the apparatus comprising:
    a power-conversion unit:
    a current-control unit to control current output from the power-conversion unit;
    a measuring unit to measure an output frequency instruction value inputted to the power-conversion unit;
    a comparator to compare the measured output frequency instruction value with a predetermined value;
    wherein the comparator provides an output to the current-control unit to control the current output from the power-conversion unit so as to be larger than a current available during ordinary no-load operation upon a determination by the comparator that the measured output frequency instruction value is less than the predetermined value, the current output from the power-conversion unit being independent of a torque output of the motor.

2. A rotational speed-control apparatus to control an induction motor, the apparatus comprising:
    a power-conversion unit;
    a current-control unit to control current output from the power-conversion unit in accordance with a current instruction value in a d-axis corresponding to a flux axis in a rotating-flux coordinate system;
    a rotational speed instruction value measuring unit to measure a rotational speed instruction value inputted to the power-conversion unit;
    an estimated rotational speed value measuring unit to measure an estimated rotational speed value;
    a comparator to compare the measured rotational speed instruction value and measured estimated rotational speed value with a predetermined value;
    wherein the comparator provides an output to the current-control unit to control d-axis current so as to be larger than a current available during an ordinary no-load operation upon a determination by the comparator that one of the measured rotational speed instruction value and measured estimated rotational speed value is less than the predetermined value.

3. A rotational speed-control apparatus to control an induction motor, the apparatus comprising:
    a power-conversion unit:
    a current control unit to control current output from the power-conversion unit in accordance with a current instruction value in a q-axis in a rotating-flux coordinate system;
    a rotational speed instruction value measuring unit to measure a rotational speed instruction value inputted to the power-conversion unit;
    an estimated rotational speed value measuring unit to measure an estimated rotational speed value;
    a comparator to compare the measured rotational speed instruction value and measured estimated rotational speed value with a predetermined value;

wherein the comparator provides an output to the current-control unit to control q-axis current so as to be larger than a current available during an ordinary no-load operation upon a determination by the comparator that one of the measured rotational speed instruction value and measured estimated rotational speed value is less than the predetermined value.

4. A rotational speed-control apparatus to control an induction motor, the apparatus comprising:

a power-conversion unit;

a current-control unit to control current output from the power-conversion unit in accordance with a current instruction value in a d-axis corresponding to a flux axis in a rotating-flux coordinate system and a current instruction value in a q-axis in a rotating-flux coordinate system;

a rotational speed instruction value measuring unit to measure a rotational speed instruction value;

an estimated rotational speed value measuring unit to measure an estimated rotational speed value;

a comparator to compare the measured rotational speed instruction value and measured estimated rotational speed value with a predetermined value;

wherein the comparator provides an output to the current control unit to control d-axis current so as to be a first predetermined value greater than a current available during ordinary no-load operation and controlling q-axis current so as to be less than a second predetermined value upon one of the measured rotational speed instruction value and measured estimated rotational speed value being less than the predetermined value.

5. The apparatus according to claim 4, wherein the second predetermined value is equal to 0.

6. A rotational speed-control apparatus to control an induction motor, the apparatus comprising:

a power-conversion unit;

a current-control unit to control current output from the power-conversion unit in accordance with one of a current instruction value in a d-axis corresponding to a flux axis in a rotating-flux coordinate system and a current instruction value in a q-axis in a rotating-flux coordinate system;

a rotational speed instruction value measuring unit to measure a rotational speed instruction value;

an estimated rotational speed value measuring unit to measure an estimated rotational speed value;

a comparator to compare the measured rotational speed instruction value and measured estimated rotational speed value with a predetermined value;

a calculator to calculate a frequency instruction value using the rotational speed instruction value in place of the estimated rotational speed value upon one of the measured rotational speed instruction value and measured estimated rotational speed value being less than the predetermined value.

7. A rotational speed-control apparatus to control an induction motor, the apparatus comprising:

a power-conversion unit;

a current-control unit to control current output from the power-conversion unit in accordance with a current instruction value in a d-axis corresponding to a flux axis in a rotating-flux coordinate system;

a rotational speed instruction value measuring unit to measure a rotational speed instruction value;

an estimated rotational speed value measuring unit to measure an estimated rotational speed value;

a comparator to compare the measured rotational speed instruction value and measured estimated rotational speed value with a predetermined value;

wherein the comparator provides an output to the current-control unit to control d-axis current so as to be a predetermined value greater than a current available during ordinary no-load operation and further comprising a calculator to calculate a frequency instruction value using the rotational speed instruction value in place of the estimated rotational speed value upon one of the measured rotational speed instruction value and measured estimated rotational speed value being less than the predetermined value.

8. A rotational speed-control apparatus to control an induction motor, the apparatus comprising:

a power-conversion unit;

a current-control unit to control current output from the power-conversion unit in accordance with a current instruction value in a q-axis in a rotating-flux coordinate system;

a rotational speed instruction value measuring unit to measure a rotational speed instruction value;

an estimated rotational speed value measuring unit to measure an estimated rotational speed value;

a comparator to compare the measured rotational speed instruction value and measured estimated rotational speed value with a predetermined value;

wherein the comparator provides an output to the current-control unit to control q-axis current so as to be greater than a predetermined value and further comprising a calculator to calculate a frequency instruction value using the rotational speed instruction value in place of the estimated rotational speed value upon one of the measured rotational speed instruction value and measured estimated rotational speed value being less than the predetermined value.

9. A rotational speed-control apparatus to control an induction motor, the apparatus comprising:

a power-conversion unit;

a voltage-calculation unit to calculate an output voltage reference value for the power-conversion unit based on an output frequency instruction value to the power-conversion unit and a frequency-calculation unit to control a frequency output from the power-conversion unit in accordance with a rotational speed instruction value;

a rotational speed instruction value measuring unit to measure a rotational speed instruction value;

a comparator to compare the measured rotational speed instruction value with a predetermined value; and a current control unit;

wherein the comparator provides a signal to the current-control unit to control d-axis current so as to be at a predetermined value larger than a current available during an ordinary no-load operation upon the measured rotational speed instruction value being less than the predetermined value.

10. A rotational speed-control apparatus to control an induction motor, the apparatus comprising:

a power-conversion unit;

a voltage-compilation unit to calculate an output voltage reference value for the power-conversion unit based on an output frequency instruction value to the power-conversion unit and a frequency-control unit to control a frequency output from the power-conversion unit in accordance with a rotational speed instruction value;

a rotational speed instruction value measuring unit to measure a rotational speed instruction value;

a comparator to compare the measured rotational speed instruction value with a predetermined value; and a current control unit;

wherein the comparator provides an output to the current control unit to control q-axis current so as to be larger than a predetermined value upon the measured rotational speed instruction value being less than the predetermined value.

11. A rotational speed-control apparatus to control an induction motor, the apparatus comprising:

a power-conversion unit to control a frequency and voltage output from the power-conversion unit in accordance with a rotational speed instruction value;

an estimated slip frequency value calculator to calculate an estimated slip frequency value in accordance with the voltage output from the power-conversion unit;

a slip frequency value calculator to calculate a slip frequency value in accordance with a current output from the power-conversion unit;

an adder to add the calculated estimated slip frequency value to the calculated slip frequency value to produce a resultant sum;

wherein the adder provides an output to the power-conversion unit to control the frequency output of the power-conversion unit in accordance with the resultant sum.

12. A rotational speed-control apparatus to control an induction motor, the apparatus comprising:

a power-conversion unit;

a voltage-calculation unit to calculate an output voltage reference value for the power-conversion unit in accordance with one of a pair of detected d and q-axis current values and a pair of d and q-axis current instruction values and in accordance with an output frequency instruction value to the power-conversion unit and to control a frequency output from the power-conversion unit in accordance with a rotational speed instruction value;

an estimated slip frequency value calculator to calculate an estimated slip frequency value in accordance with the voltage output from the power-conversion unit;

a slip frequency value calculator to calculate a slip frequency value in accordance with a current output from the power-conversion unit;

an adder to add the calculated estimated slip frequency value to the calculated slip frequency value to produce a resultant sum;

wherein the adder provides an output to the power-conversion unit to control the frequency output of the power-conversion unit in accordance with the resultant sum.

13. A rotational speed-control apparatus to control an induction motor, the apparatus comprising:

a power conversion unit and a current-control unit to control current output from the power-conversion unit and to control a frequency output from the power-conversion unit in accordance with one of a rotational speed instruction value and an estimated rotational speed value;

an estimated slip frequency value calculator to calculate an estimated slip frequency value in accordance with the voltage output from the power-conversion unit;

a slip frequency value calculator to calculate a slip frequency value in accordance with a current output from the power-conversion unit;

an adder to add the calculated estimated slip frequency value to the calculated slip frequency value to produce a resultant sum;

wherein the adder provides an output to the power-conversion unit to control the frequency output of the power-conversion unit in accordance with the resultant sum.

14. The apparatus according to any one of claims 11–13, wherein the estimated slip frequency value calculator calculates the estimated slip frequency value in accordance with a ratio of a d-axis induced-electromotive force value to a q-axis induced-electromotive force value.

15. The apparatus according to any one of claims 11–13, wherein the estimated slip frequency value calculator calculates the estimated slip frequency value in accordance with one of a d-axis voltage instruction value and a detected d-axis voltage value, and one of a q-axis voltage instruction value and a detected q-axis voltage value.

16. The apparatus according to any one of claims 11–13, wherein the estimated slip frequency value calculator calculates the estimated slip frequency value in accordance with a ratio of a q-axis flux value to a d-axis flux value.

17. The apparatus according to any one of claims 11–13, wherein the estimated slip frequency value calculator calculates the estimated slip frequency value in accordance with a ratio of a q-axis flux value, obtained in accordance with the value of the frequency output from the power-conversion unit and one of a d-axis voltage instruction value and a detected d-axis voltage value, to a d-axis flux value, obtained in accordance with the value of the frequency output of the power-conversion unit and one of a q-axis voltage instruction value and a detected q-axis voltage value.

18. The apparatus according to claim 16, further comprising:

a d-axis flux value calculator to calculate the d-axis flux value in accordance with a ratio of a value obtained by subtracting a sum of a q-axis resistance voltage-decrease and a q-axis leakage-reactance voltage decrease from one of a q-axis voltage instruction value and a detected q-axis voltage value, to the value of the output frequency; and a q-axis flux value calculator to calculate the q-axis flux value in accordance with a ratio of a value obtained by subtracting a difference between a d-axis resistance voltage-decrease and a d-axis leakage-reactance voltage-decrease from one of a d-axis voltage instruction value and a detected d-axis voltage value, to the value of the output frequency.

19. The apparatus according to claim 16, further comprising:

a d-axis flux value calculator to calculate the d-axis flux value by integrating a value obtained by subtracting a difference between a d-axis resistance voltage-decrease and a d-axis leakage-reactance voltage-decrease from one of a d-axis voltage instruction value and a detected d-axis voltage value and further subtracting a d-axis induced-electromotive force from a result of the subtraction; and a q-axis flux value calculator to calculate the q-axis flux value by integrating a value obtained by subtracting a difference between a q-axis resistance voltage-decrease and a q-axis leakage-reactance voltage-decrease from one of a q-axis voltage instruction value and a detected q-axis voltage value and further adding a q-axis induced-electromotive force to a result of the subtraction.

20. The apparatus according to any one of claims 11–13, wherein the slip frequency value calculator calculates the slip frequency value in accordance with a ratio of one of the q-axis current instruction value and the detected q-axis current value to a d-axis flux value.

21. A rotational speed-control apparatus to control an induction motor, the apparatus comprising:
- a power-conversion unit to control a frequency and voltage output from the power-conversion unit in accordance with a rotational speed instruction value;
- a rotational speed instruction value measuring unit to measure a rotational speed instruction value;
- a comparator to compare the measured rotational speed instruction value with a predetermined value;
- wherein the comparator provides an output to the power-conversion unit to control current output from the power-conversion unit so as to be at a predetermined value larger than a current available during an ordinary no-load operation, and to correct the output current in correspondence with a value of a torque output of the motor upon the measured rotational speed instruction value being less than the predetermined value.

22. A rotational speed-control apparatus to control a frequency output from a power-conversion unit for an induction motor in accordance with a rotational speed instruction value using a voltage-calculation unit to calculate an output voltage reference value for the power-conversion unit based on one of a pair of detected d and q-axis current values and a pair of d and q-axis current instruction values and based on a value of the frequency output from the power-conversion unit, the apparatus comprising:
- a rotational speed instruction value measuring unit to measure a rotational speed instruction value;
- a comparator to compare the measured rotational speed instruction value with a predetermined value;
- wherein the comparator provides an output to the power-conversion unit to control current output from the power-conversion unit so as to be a predetermined value larger than a current available during an ordinary no-load operation, and to correct the output current in correspondence with a value of a torque output of the motor upon the measured rotational speed instruction value being less than the predetermined value.

23. A rotational speed-control apparatus to control a frequency output from a power-conversion unit for an induction motor in accordance with one of a rotational speed instruction value and an estimated rotational speed value using current-control units for controlling current output from the power-conversion unit, the apparatus comprising:
- a rotational speed instruction value measuring unit to measure a rotational speed instruction value;
- an estimated rotational speed value measuring unit the estimated rotational speed value;
- a comparator to compare the measured rotational speed instruction value and the measured estimated rotational speed value with a predetermined value;
- wherein the comparator provides an output to the power-conversion unit to control current output from the power-conversion unit so as to be at a predetermined value larger then a current available during an ordinary no-load operation, and to correct the output current in correspondence with a value of a torque output of the motor upon one of the measured rotational speed instruction value and measured estimated rotational speed value being less than the predetermined value.

24. The apparatus according to any one of claims 21–23, further comprising a d-axis current corrector to correct a value of d-axis current in correspondence with the value of the torque output of the motor.

25. The apparatus according to any one of claims 21–23, further comprising a q-axis current corrector to correct a value of q-axis current in correspondence with the value of the torque output of the motor.

26. The apparatus according to any one of claims 21–23, further comprising a means for obtaining the value of the torque output based on one of a pair of d-axis and q-axis voltage instruction values and a pair of detected d-axis and q-axis voltage values and based on one of a pair of d-axis and q-axis current instruction values and a pair of detected d-axis and q-axis current values, the d-axis and q-axis being axes in a rotating-flux coordinate system.

27. The apparatus according to any one of claims 21–23, further comprising a means for obtaining the value of the torque output based on one of a pair of d-axis and q-axis voltage instruction values and a pair of detected d-axis and q-axis voltage values, the d-axis and q-axis flux values being calculated with the value of the frequency output from the power-conversion unit and based on one of a pair of d-axis and q-axis current instruction values and a pair of detected d-axis and q-axis current values in a rotating coordinate system, the d-axis and q-axis being axes in a rotating-flux coordinate system.

28. A rotational speed-control apparatus to control a frequency and current output from a power-conversion unit for an induction motor in accordance with a rotational speed instruction value, the apparatus comprising:
- a rotational speed instruction value measuring unit to measure the rotational speed instruction value;
- a comparator to compare the measured rotational speed instruction value with a predetermined value;
- wherein the comparator provides an output to the power-conversion unit to control current output from the power-conversion unit so as to be at a predetermined value larger than a current available during an ordinary no-load operation and to correct the value of the current in accordance with a value obtained by adding a calculated estimated slip frequency value based on a value of a voltage output from the power-conversion unit to a calculated slip frequency value based on a value of current output from the power-conversion unit upon the measured rotational speed instruction value being less than the predetermined value.

29. A rotational speed-control apparatus to control a frequency output from a power-conversion unit for an induction motor in accordance with a rotational speed instruction value using a voltage-calculation unit to calculate an output voltage reference value based on one of a pair of d-axis and q-axis current instruction values and a pair of detected d-axis and q-axis values in a rotating-flux coordinate system and based on the value of the frequency output of the power-conversion unit, the apparatus comprising:
- a rotational speed instruction value measuring unit to measure the rotational speed instruction value;
- a comparator to compare the measured rotational speed instruction value with a predetermined value;

wherein the comparator provides an output to the power-conversion unit to control current output from the power-conversion unit so as to be at a predetermined value larger than a current available during an ordinary no-load operation and to correct the value of the current in accordance with a value obtained by adding a calculated estimated slip frequency value based on a value of a voltage output from the power-conversion unit to a calculated slip frequency value based on a value of current output from the power-conversion unit upon the measured rotational speed instruction value being less than the predetermined value.

30. A rotational speed-control apparatus to control a frequency output from a power-conversion unit to drive an induction motor in accordance with one of a rotational speed instruction value and an estimated rotational speed value using a current-control unit to control current output from the power-conversion unit, the apparatus comprising:

a rotational speed instruction value measuring unit to measure the rotational speed instruction value;

an estimated rotational speed value measuring unit to measure the estimated rotational speed value;

a comparator to compare the measured rotational speed instruction value and the measured estimated rotational speed value with a predetermined value;

wherein the comparator provides an output to the power-conversion unit to control current output from the power-conversion unit so as to be a predetermined value larger than a current available during ordinary no-load operation upon one of the measured rotational speed instruction value and the measured estimated rotational speed value being less than the predetermined value.

31. The apparatus according to any one of claims 28–30, further comprising a means for correcting a value of the d-axis current in correspondence with a sum of the estimated slip frequency value and the calculated slip frequency value.

32. The apparatus according to any one of claims 28–30, further comprising a means for correcting a value of the q-axis current in correspondence with a sum of the estimated slip frequency value and the calculated slip frequency value.

* * * * *